Aug. 9, 1938.    G. F. HANDLEY    2,126,323
TYPEWRITING MACHINE
Filed July 23, 1936    15 Sheets-Sheet 3
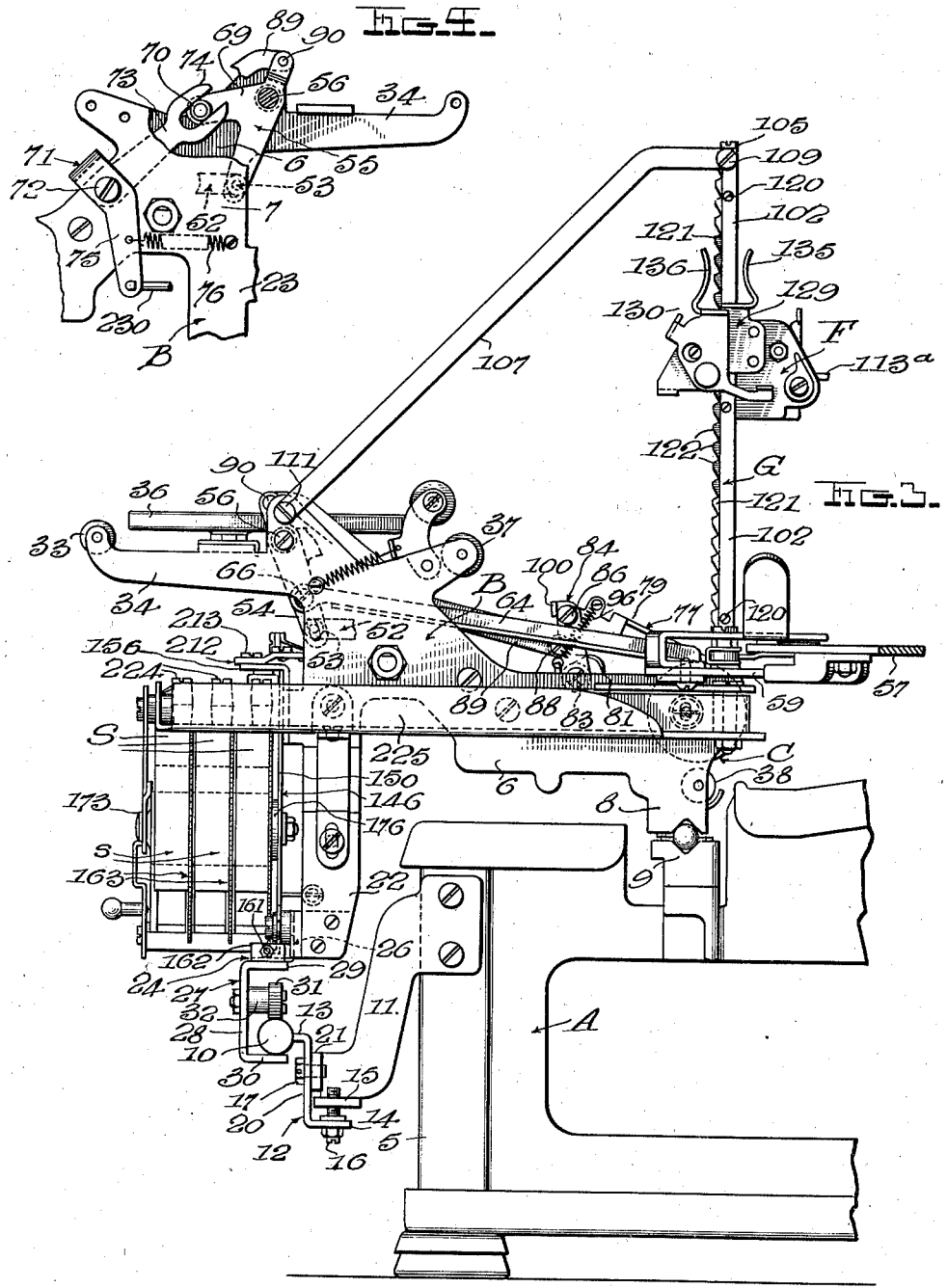
INVENTOR
GEORGE F. HANDLEY
BY Baldwin + Wight
ATTORNEYS

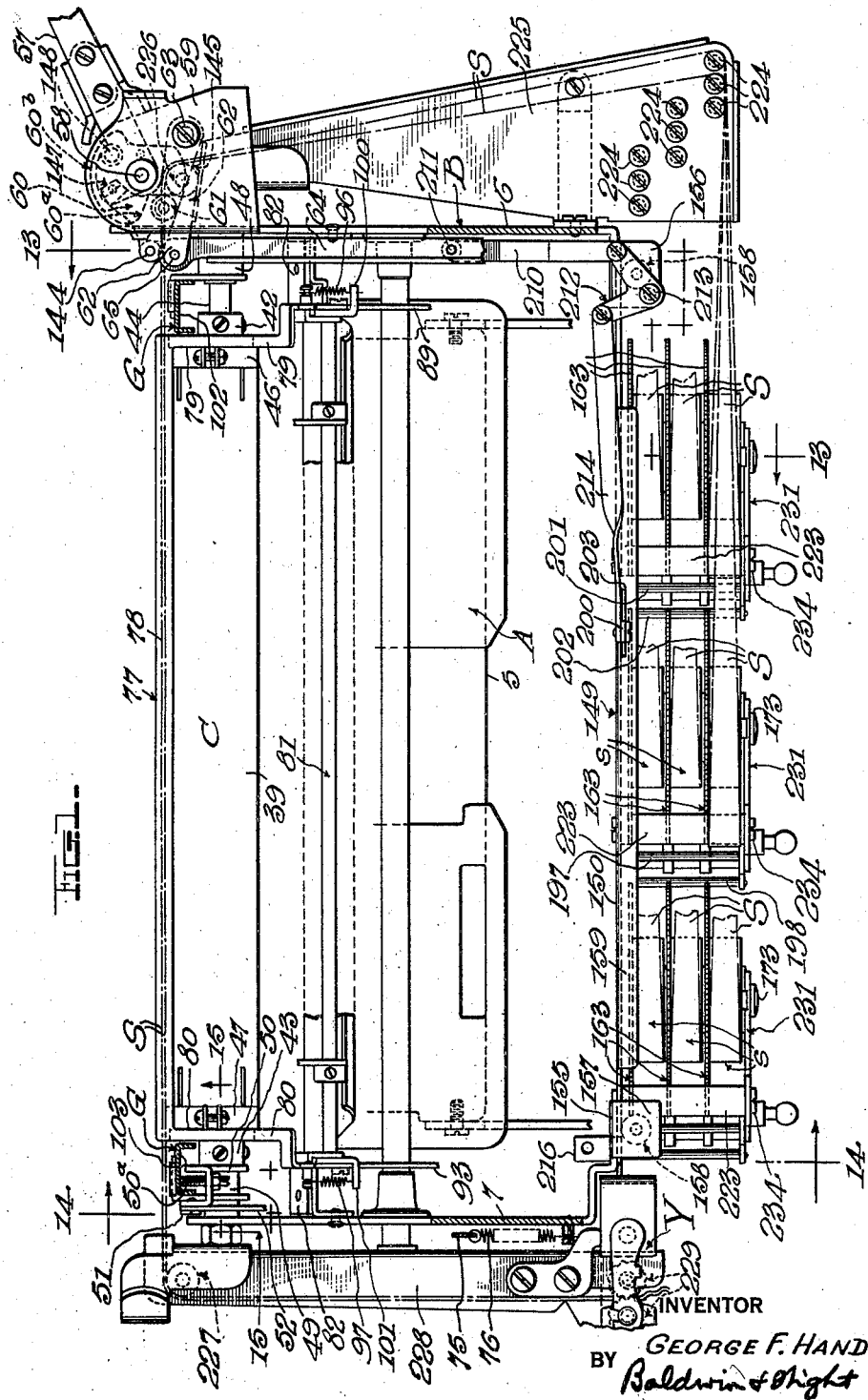

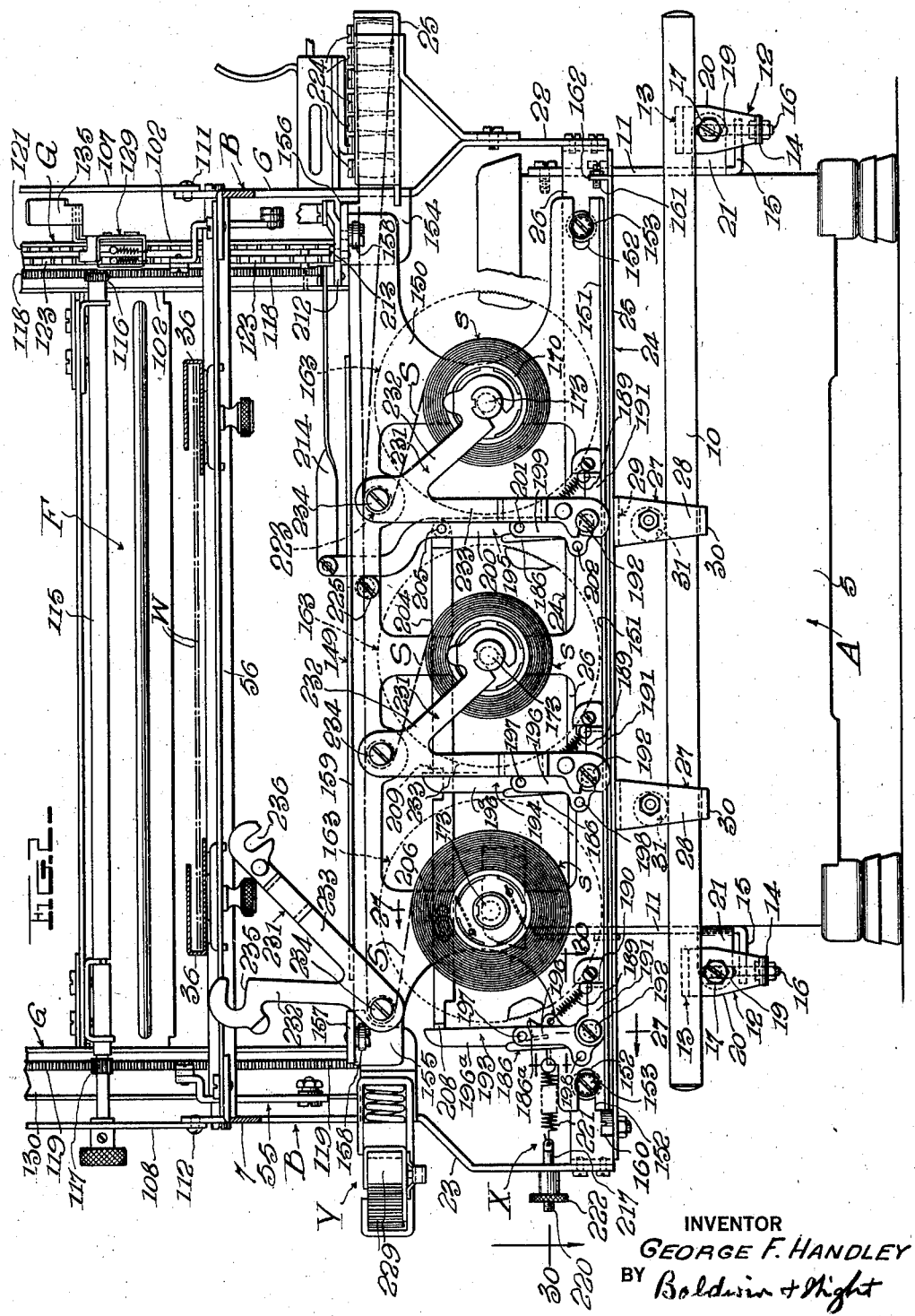

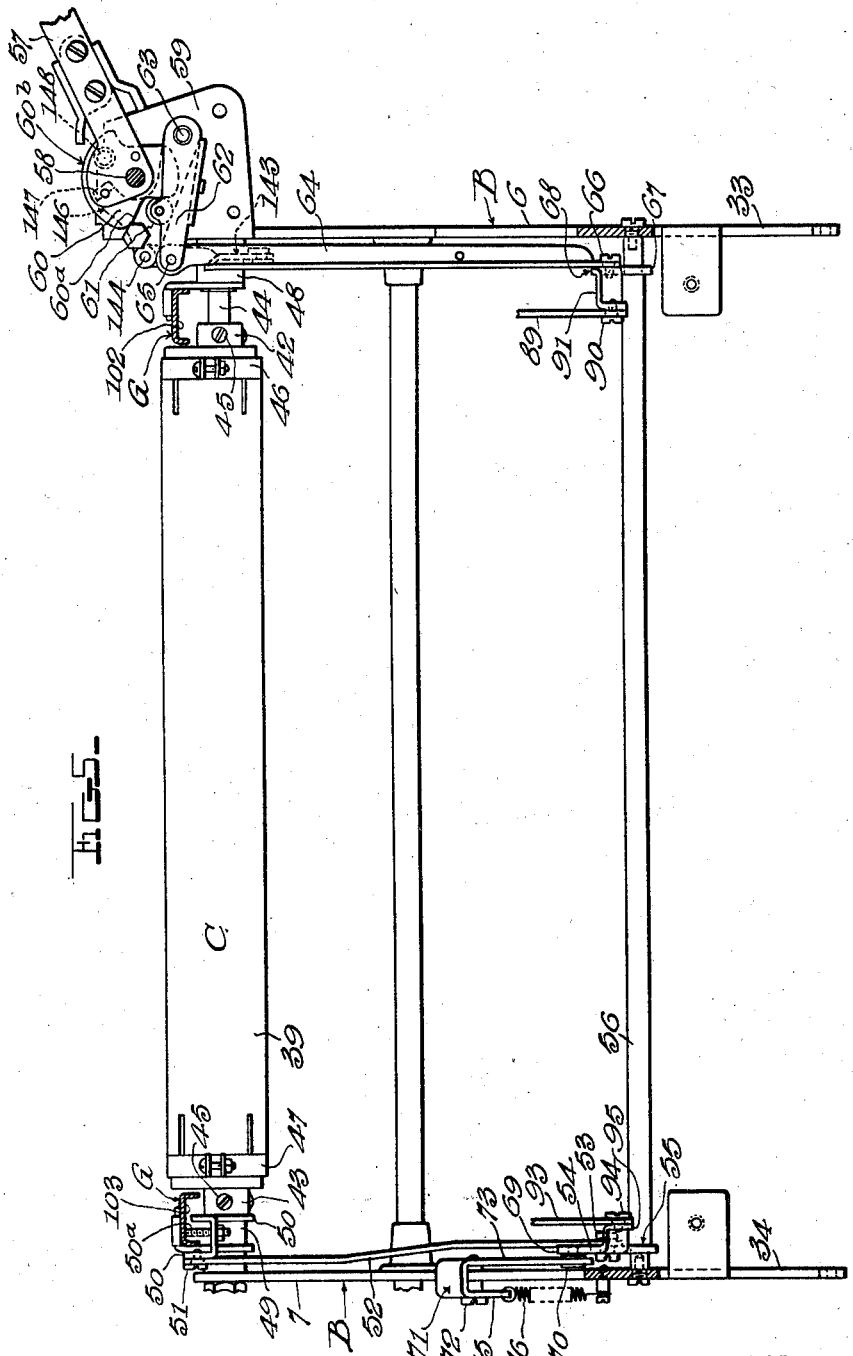

Aug. 9, 1938.    G. F. HANDLEY    2,126,323
TYPEWRITING MACHINE
Filed July 23, 1936    15 Sheets-Sheet 5
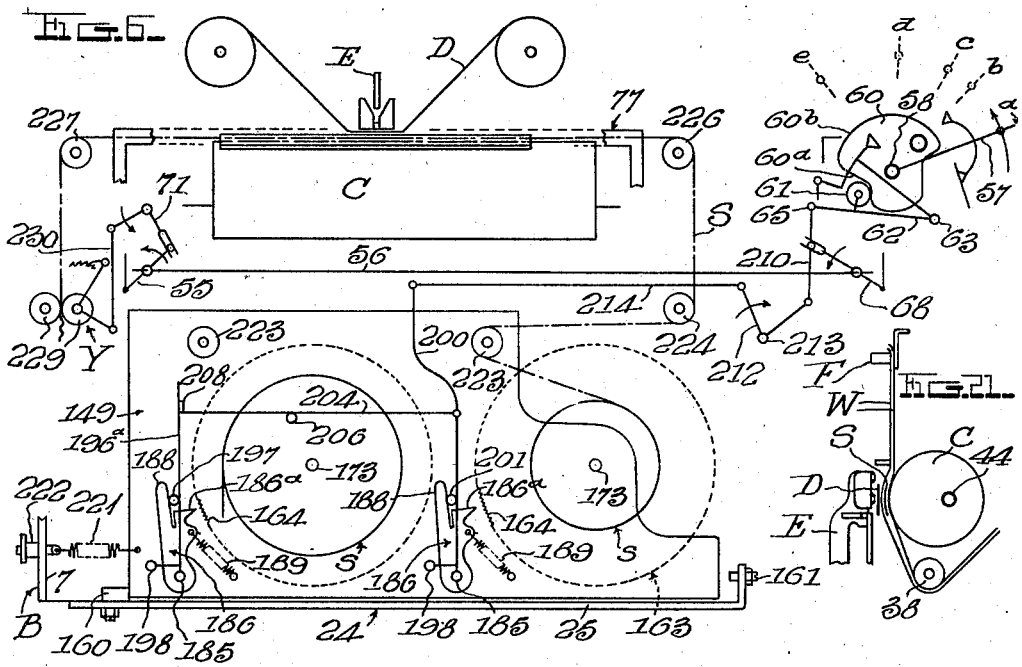
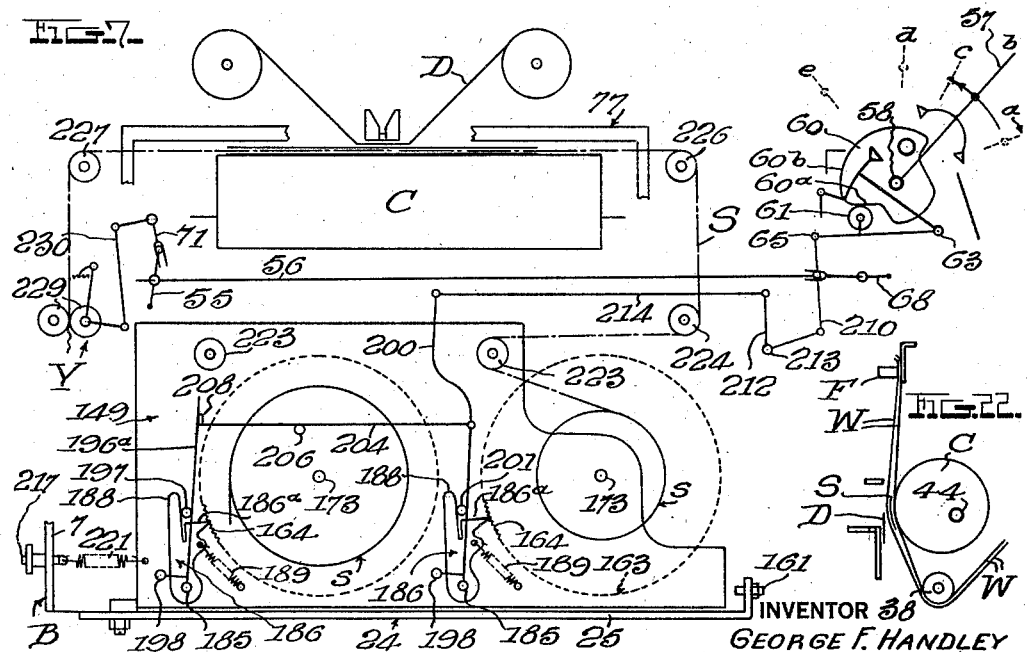
INVENTOR
GEORGE F. HANDLEY
BY Baldwin & Wight
ATTORNEYS Aug. 9, 1938.   G. F. HANDLEY   2,126,323
TYPEWRITING MACHINE
Filed July 23, 1936   15 Sheets-Sheet 6
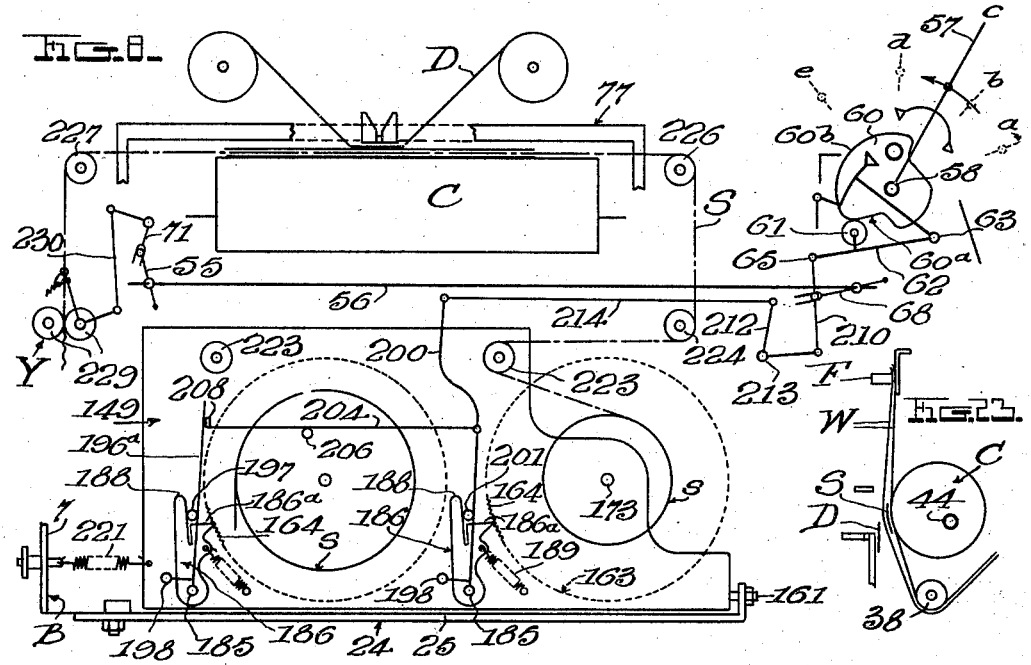
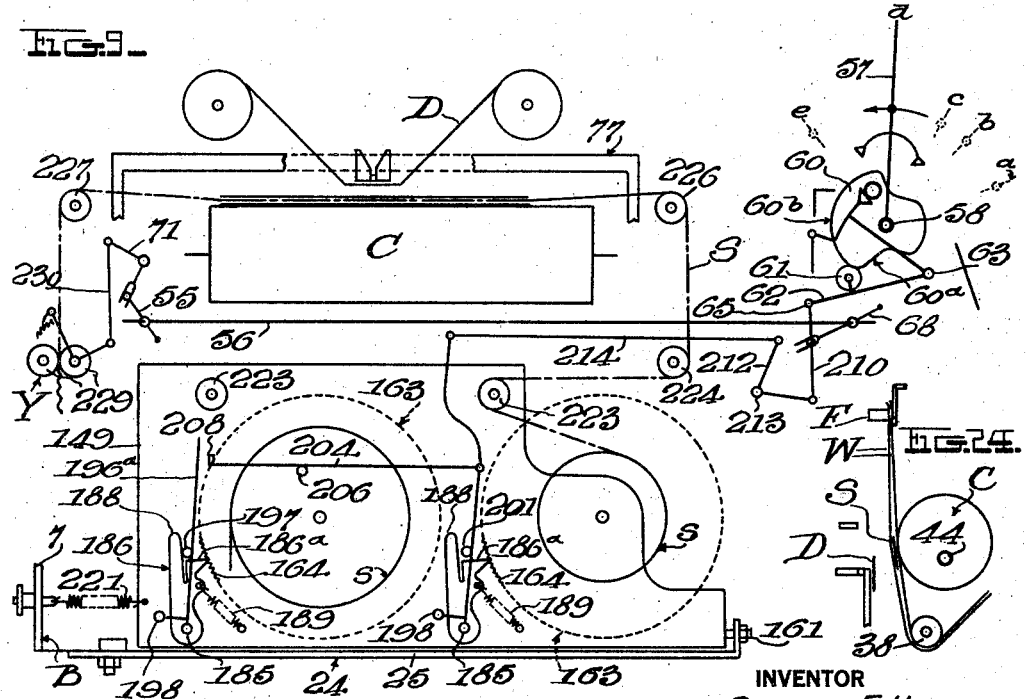
INVENTOR
GEORGE F. HANDLEY
BY Baldwin & Wight
ATTORNEYS Aug. 9, 1938.　　　　G. F. HANDLEY　　　　2,126,323
TYPEWRITING MACHINE
Filed July 23, 1936　　　15 Sheets-Sheet 7
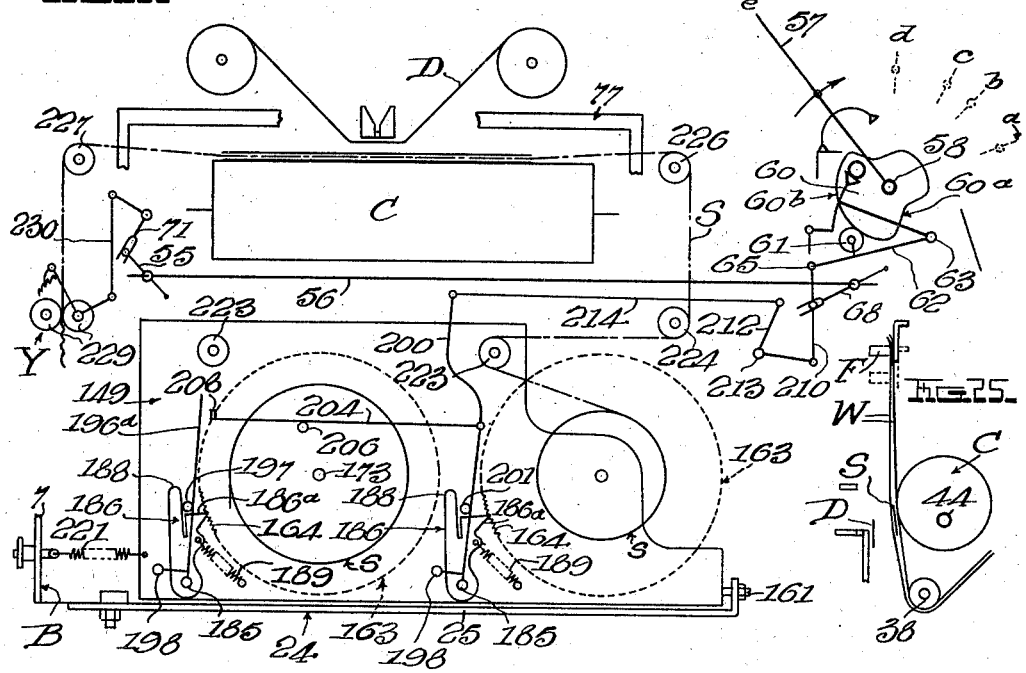
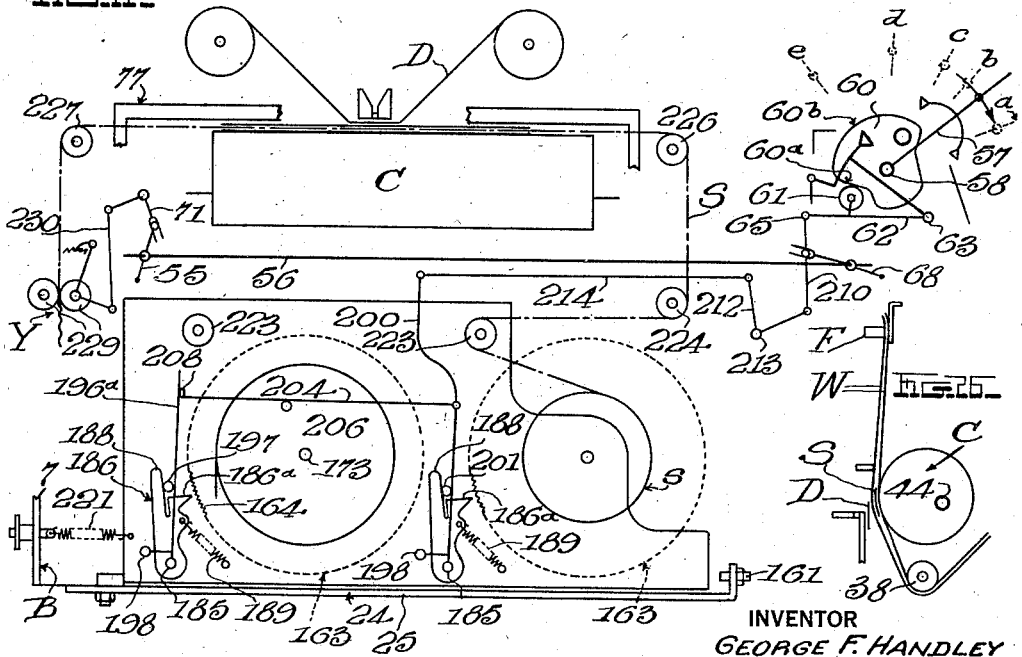
INVENTOR
GEORGE F. HANDLEY
BY Baldwin & Wight
ATTORNEYS

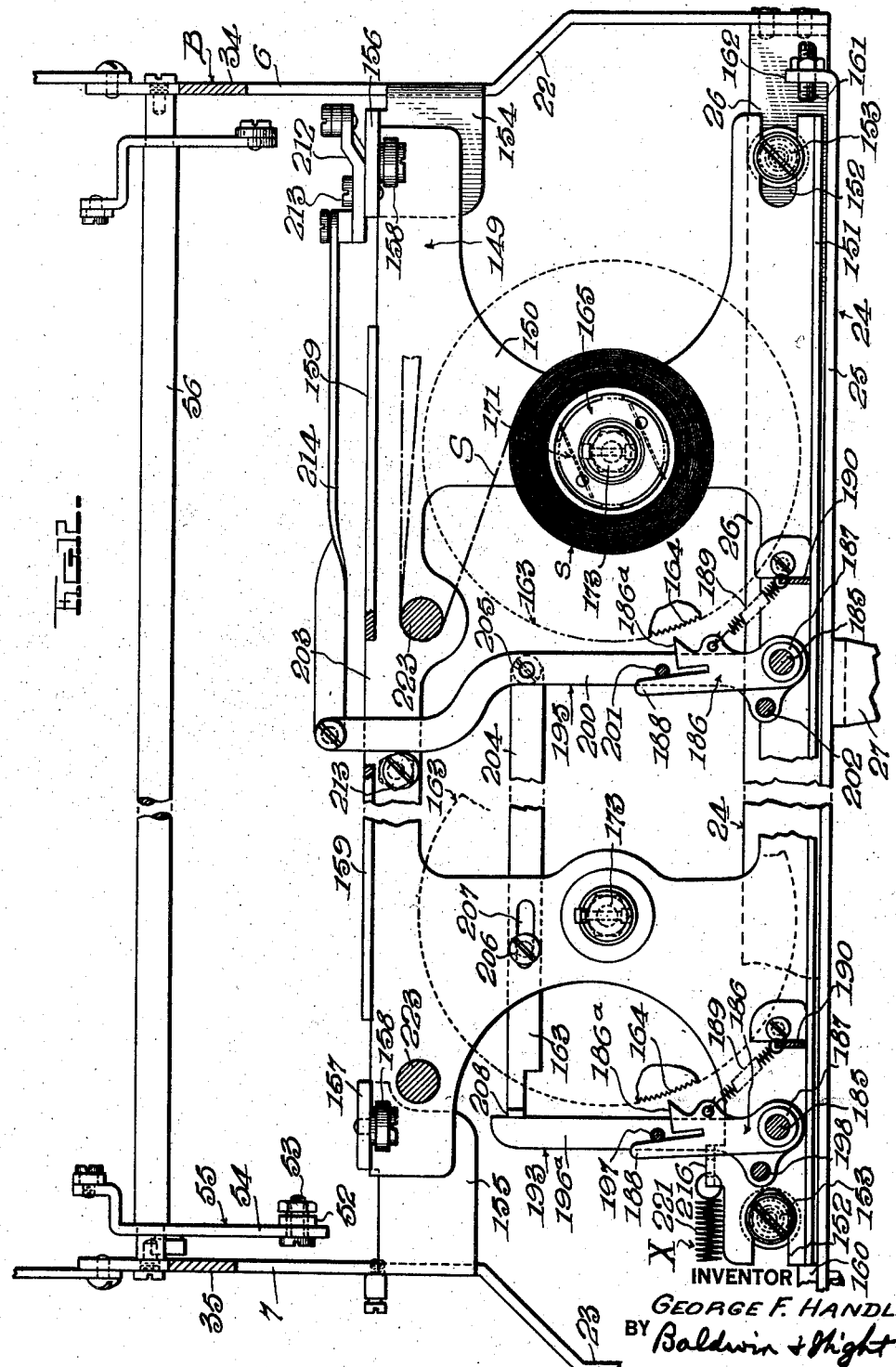

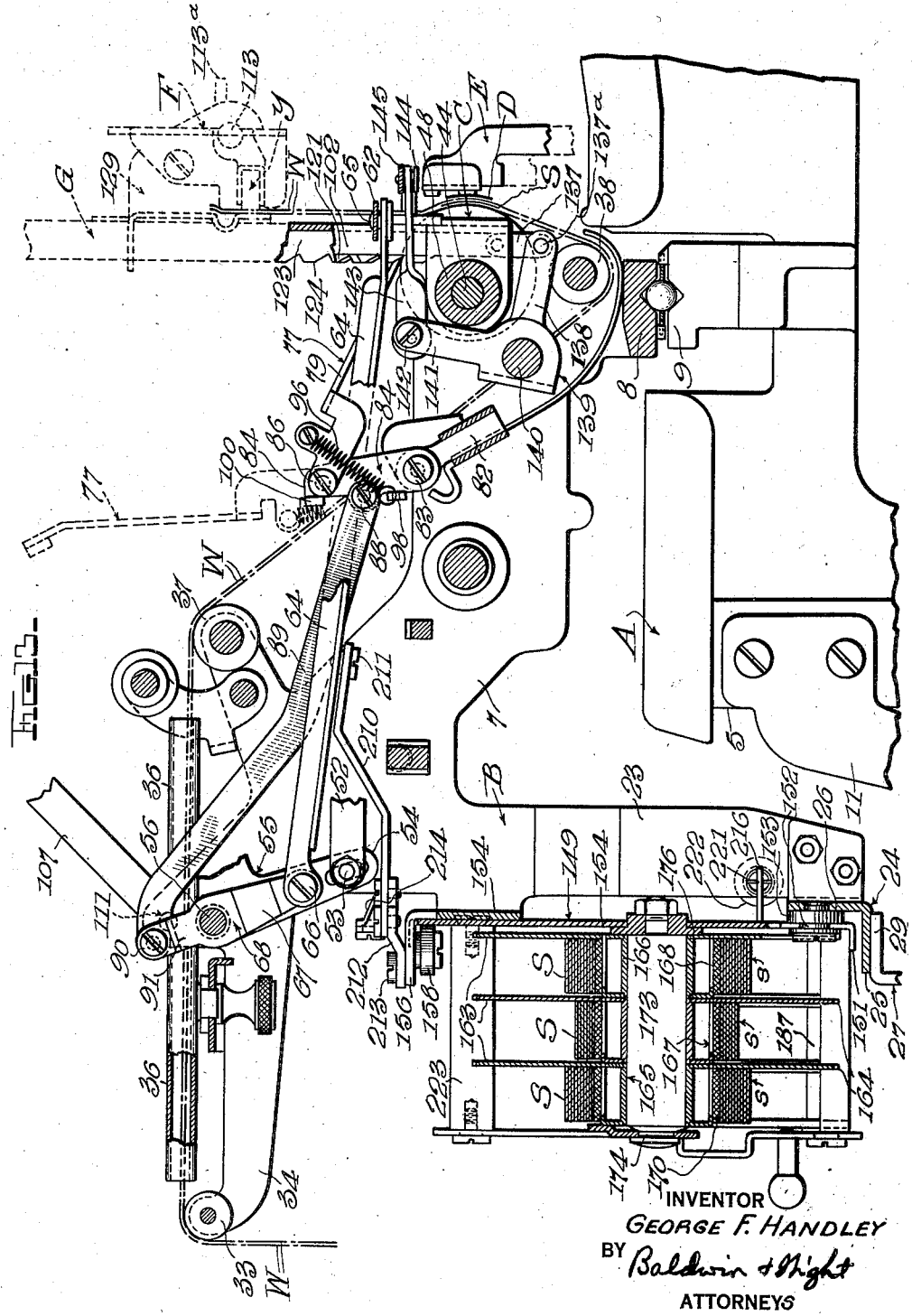

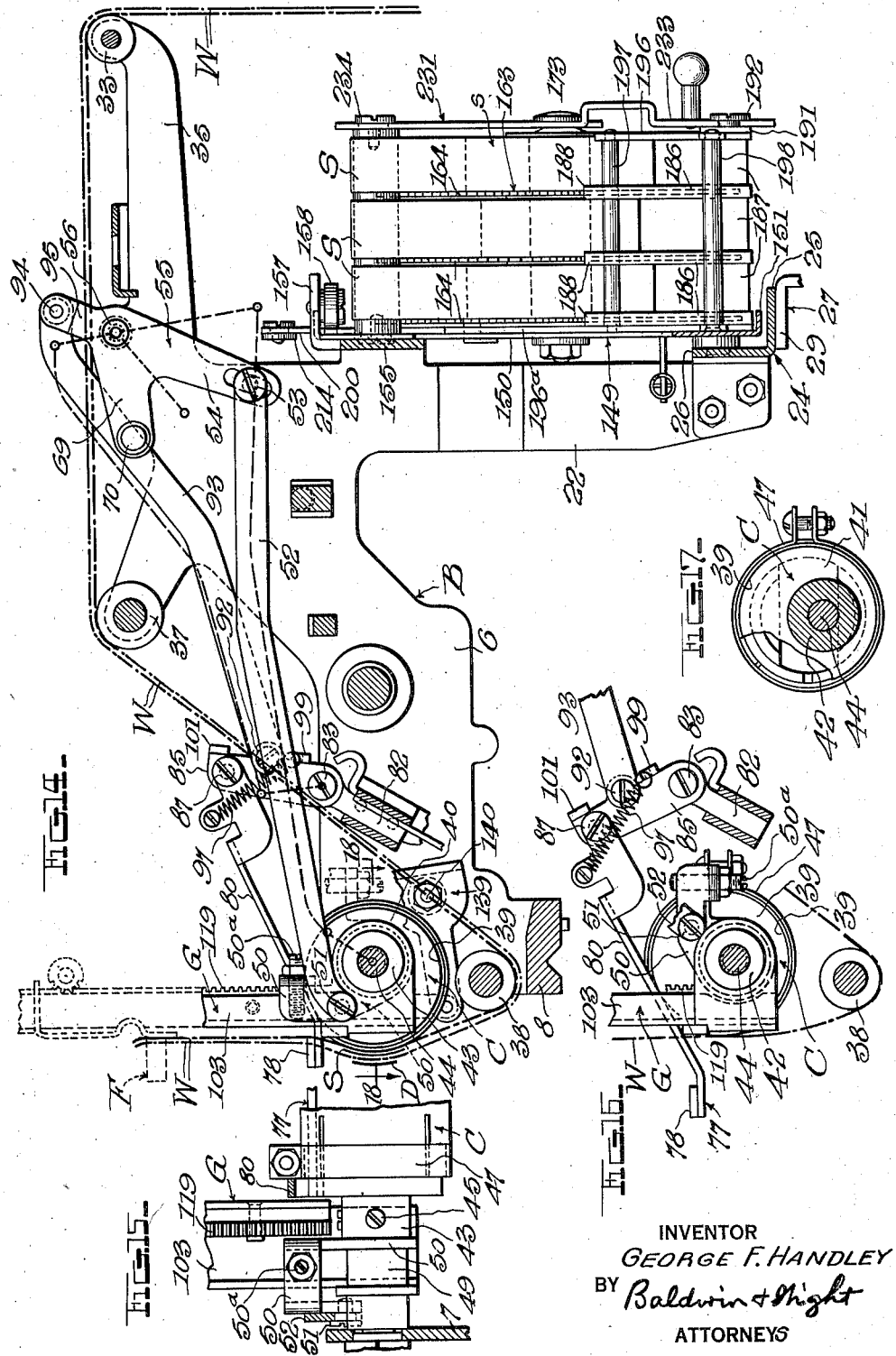

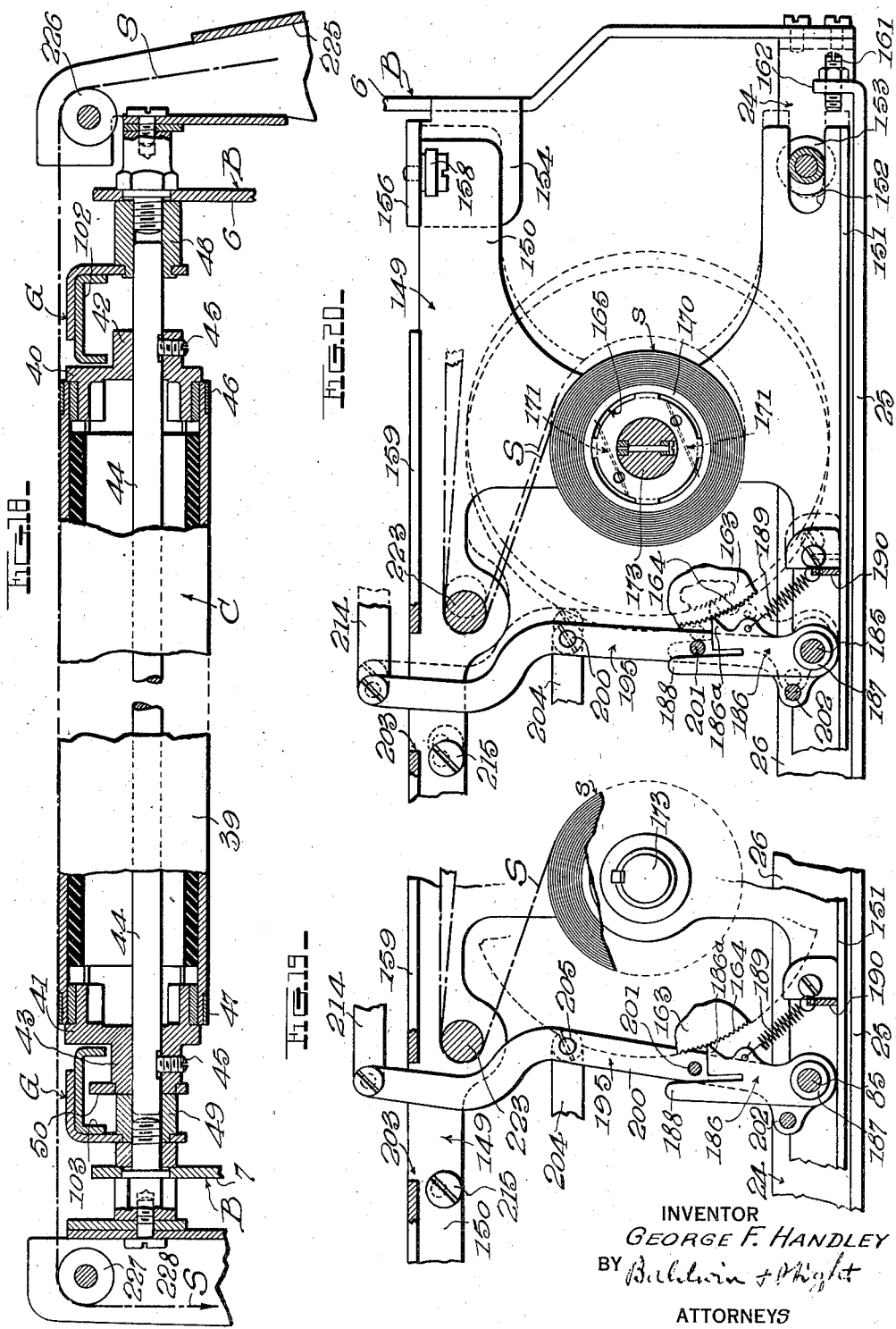

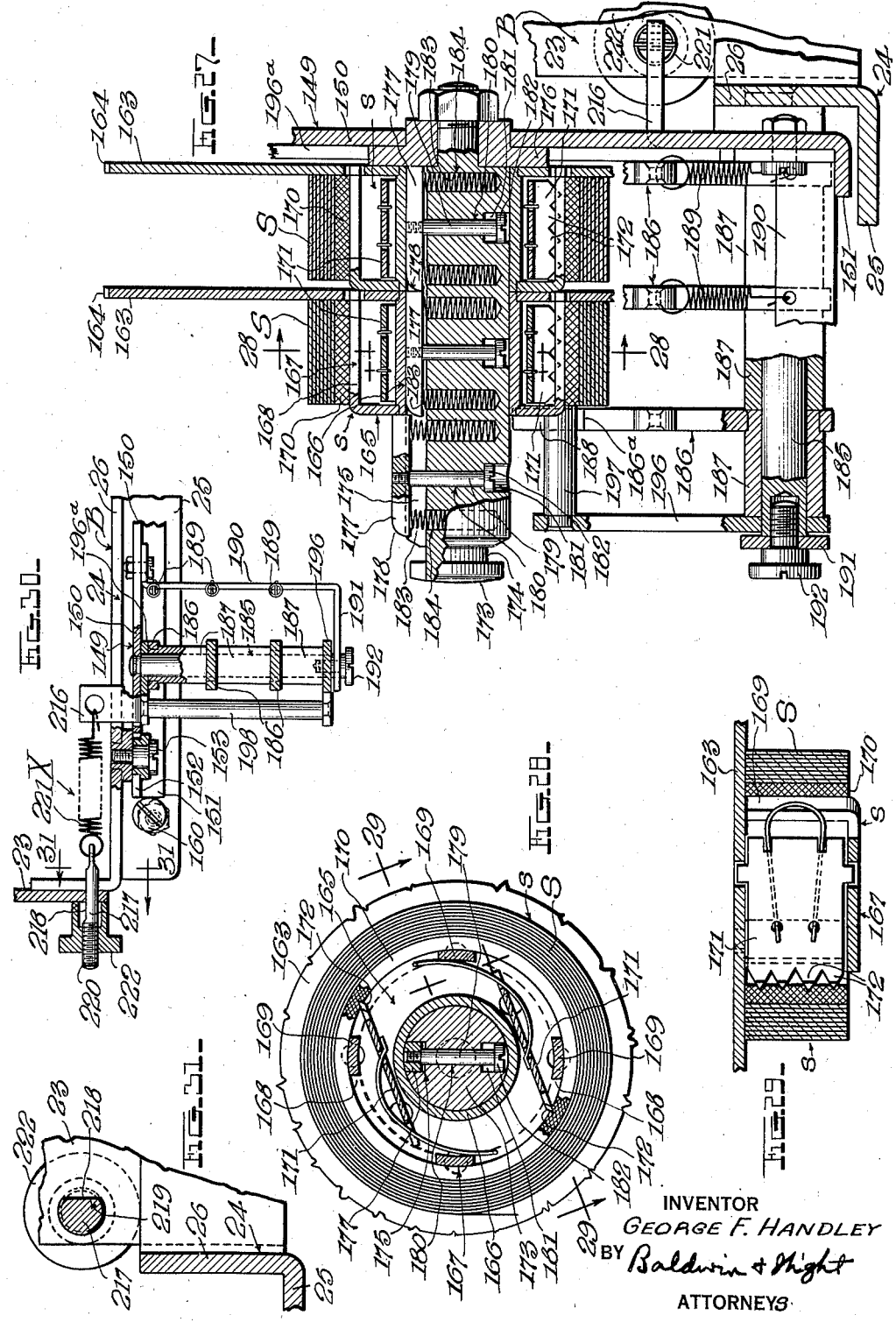

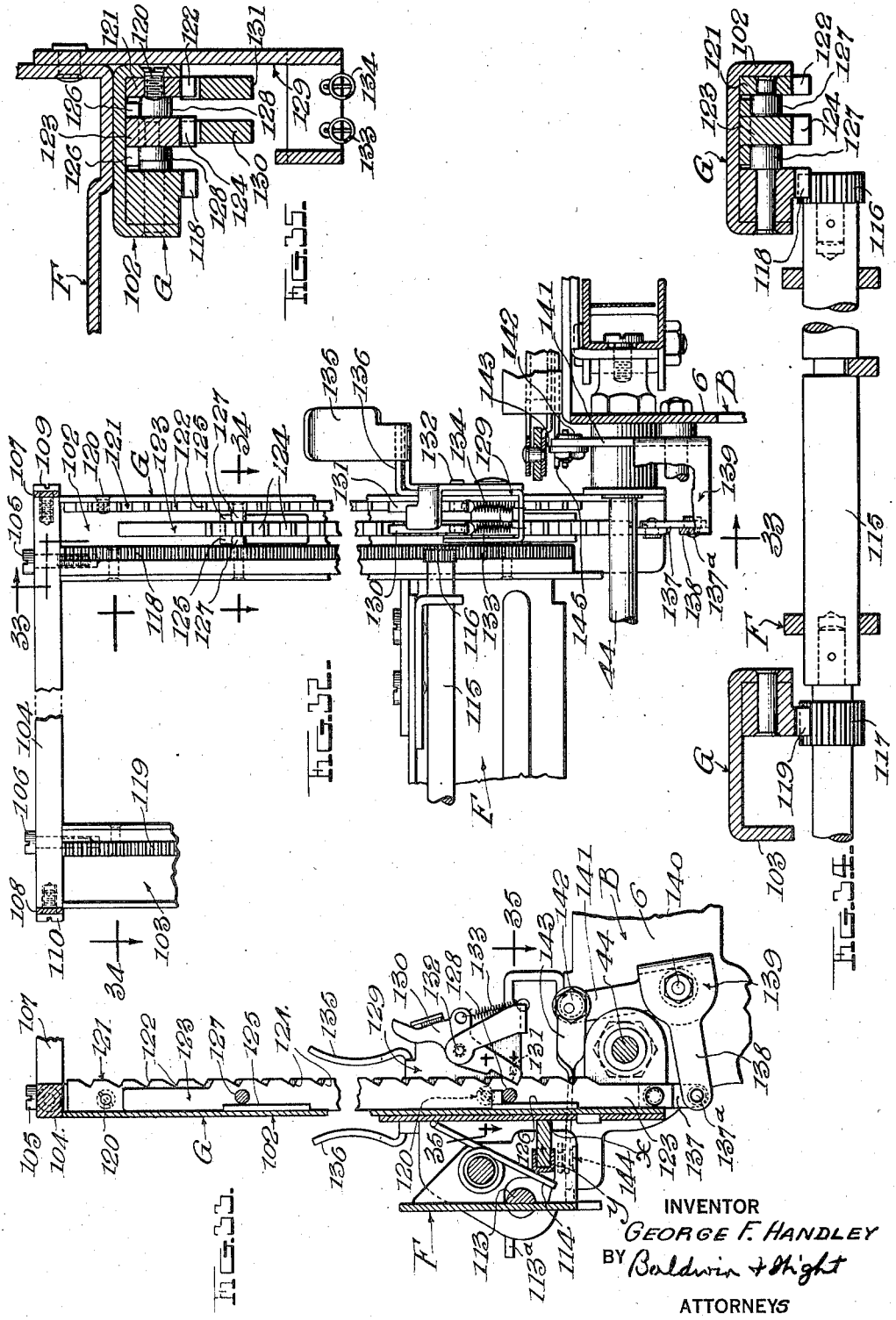

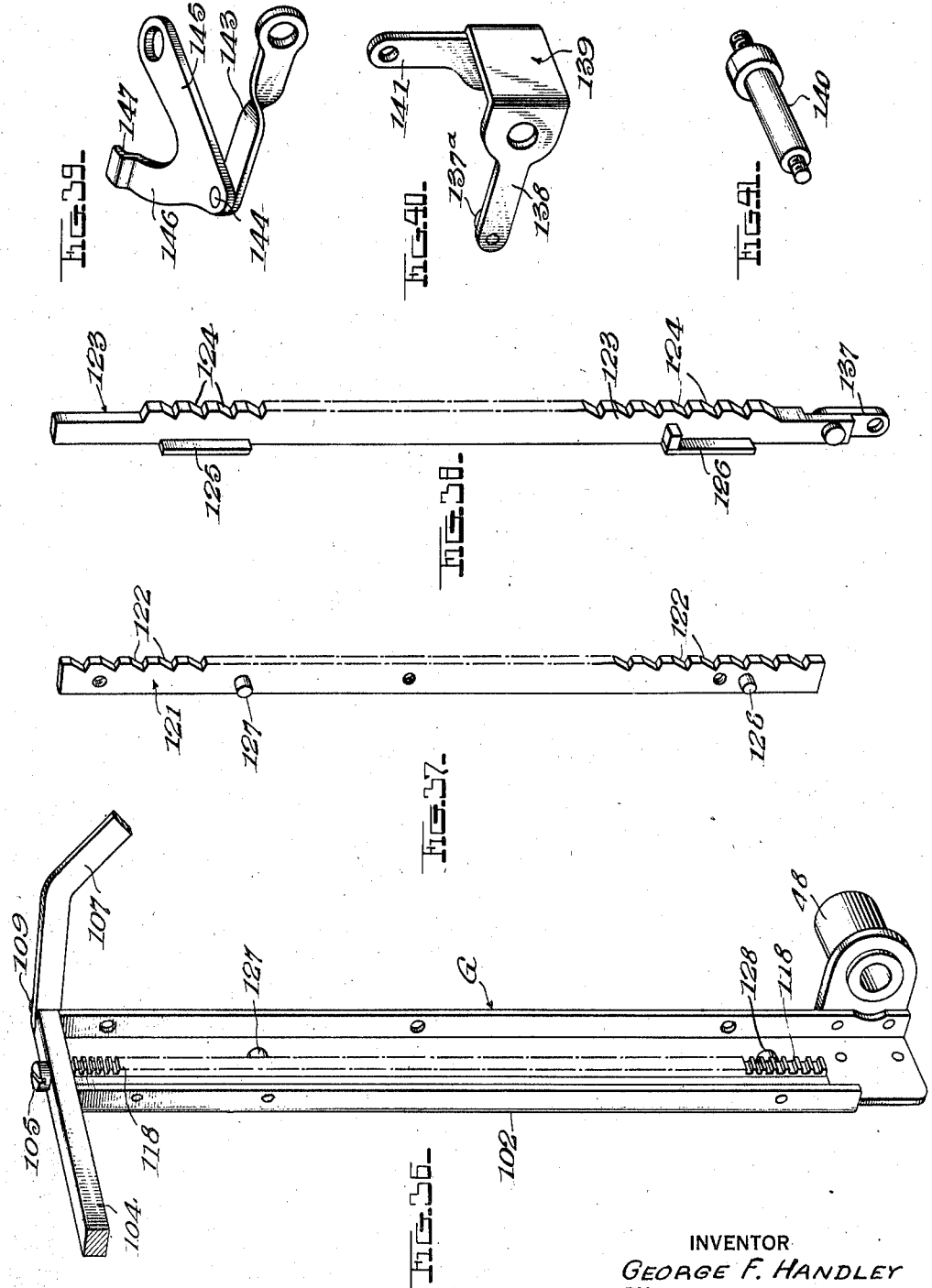

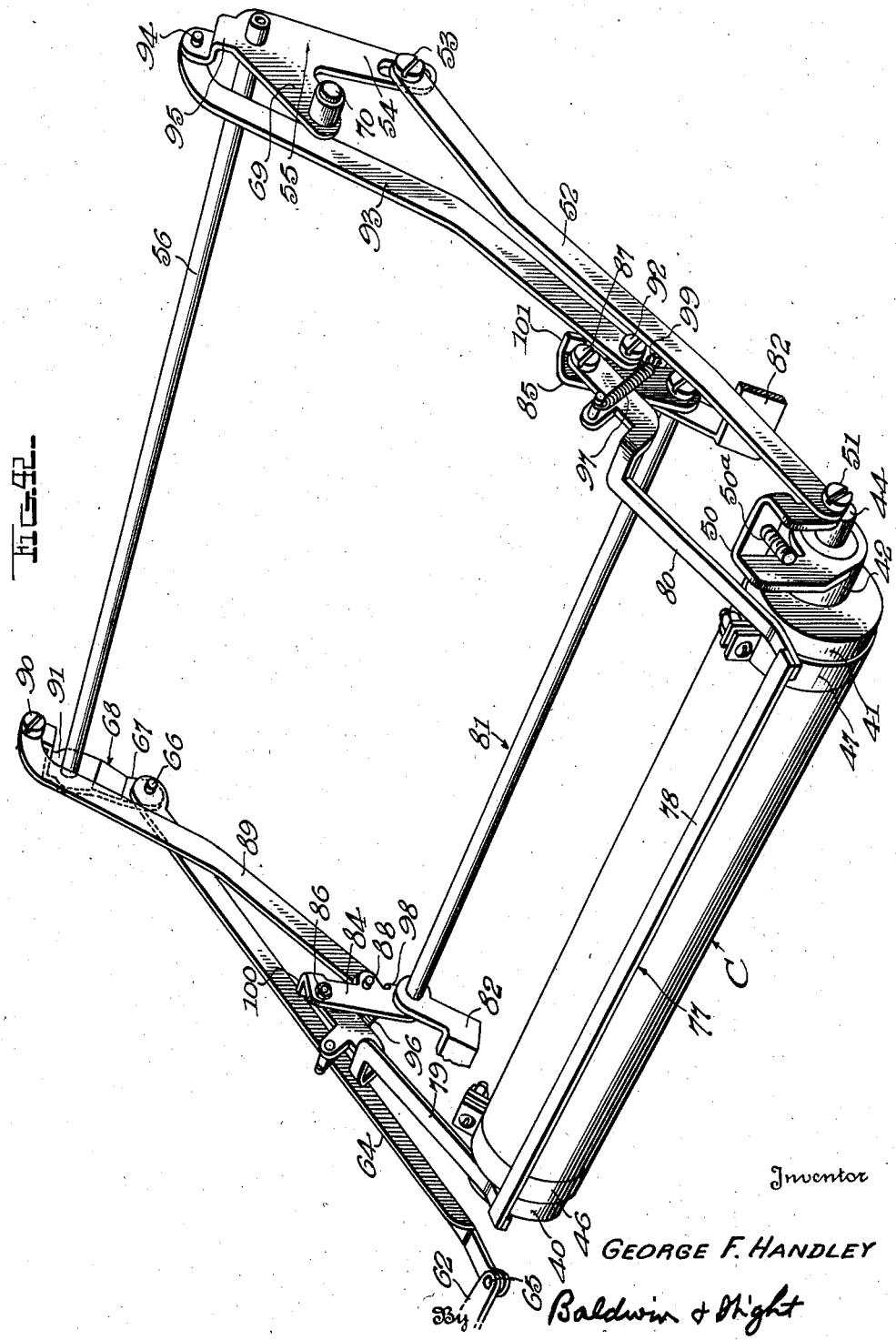

Patented Aug. 9, 1938

2,126,323

UNITED STATES PATENT OFFICE 2,126,323

TYPEWRITING MACHINE

George F. Handley, Glendale, N. Y., assignor to Royal Typewriter Company, Inc., New York, N. Y., a corporation of New York Application July 23, 1936, Serial No. 92,241

47 Claims. (Cl. 197—153)

This invention relates to new and useful improvements in manifolding devices which may be readily applied to any standard typewriting machine without changing such machine in any material respect, and embodies certain improvements over the following patents: Degener 1,853,302 and 1,853,670, Apr. 12, 1932.

Among the several objects of this invention are to provide a platen which is mounted to swing about an eccentric axis for rearward movement with respect to the work sheets whereby the normal tight contact relation between the platen and the work sheets will be quickly relieved to permit the immediate feeding of the carbon strips across the work sheets; to provide means for mounting the movable platen whereby the force of the type impacts will be directed against the fulcrum of the platen; to provide a bail for positioning the work sheets against the platen above the writing line thereof to thereby avoid the upper type striking said sheets when the lower types are being employed; to provide means for moving the bail forwardly when the platen is moved rearwardly whereby the work sheets will be relieved of their normal tight contact relation with the platen prior to the line spacing of the work sheets; to provide means for feeding a plurality of carbon strips through the work sheets; to provide means for mounting the carbon strip spools on the carriage for transverse movements relative thereto; to provide means for yieldably retaining the spools against forward movement; to provide means for locking the spools against rotation whereby the strip feeding operation will effect a forward travel of the locked spools by the strips against the tension of said yieldable means; to provide means for effecting release of the spool locking means and the unwinding of the spools during the return movement of the latter by the yieldable retaining means; to provide a spool assembly of novel construction; to provide means for guiding the strips after they leave the spools; to provide means for braking the spools during their return movement, and to provide means for supporting the outer ends of the spool shafts and the outer ends of the associated pawl bearing shafts.

With these and other objects in view which will more fully appear, the nature of the invention will be more clearly understood by following the description, the appended claims, and the several views illustrated in the accompanying drawings.

In the drawings:

Figure 1 is a top plan view of a portion of a typewriting machine constructed in accordance with my invention, parts thereof being shown in section, Figure 2 is a rear elevation thereof, Figure 3 is a partial elevation of the left side of the machine, Figure 4 is a detail elevation of the means for operating the carbon strip means, Figure 5 is a detail plan view showing the carriage return lever in its normal position, and the connections therewith for rocking the platen, Figures 6 to 11 inclusive are diagrammatic views showing the different positions of the parts employed in line spacing the work sheets, and in feeding the carbon strips, Figure 12 is an enlarged elevation, partly in section, of the carriage which supports the carbon strip rolls, Figure 13 is a vertical sectional view taken on the irregular line 13—13 of Figure 1, Figure 14 is a similar view but taken on the line 14—14 of Figure 1, Figure 15 is a detail sectional view taken on the line 15—15 of Figure 1, Figure 16 is a detail section showing the work sheet bail in its forward or inoperative position, Figure 17 is a detail cross-sectional view showing the platen in its rearmost or inoperative position, Figure 18 is a longitudinal section taken on the line 18—18 of Figure 14 and showing the platen and the mounting therefor, Figure 19 is an enlarged vertical section showing the carbon strip roll mounting, the parts being in the positions shown in Figure 10, Figure 20 is a similar view but showing the parts in the positions shown in Figure 11, Figures 21 to 26 inclusive are diagrammatic views showing the bail, the collating frame, and the platen, in different positions, and corresponding in timed relation to the positions of the parts shown in Figs. 6 to 11 inclusive, Figure 27 is an enlarged section taken on irregular line 27—27 on Figure 2, one of the carbon strip rolls being removed, Figure 28 is a cross section taken on the line 28—28 of Figure 27, Figure 29 is a cross section taken on the line 29—29 of Figure 28, Figure 30 is an enlarged horizontal section taken on the line 30—30 of Figure 2, Figure 31 is an enlarged section taken on the line 31—31 of Figure 30, Figure 32 is a rear elevation of the collating frame and its mounting, and showing the means for removably mounting the rack bar, Figure 33 is a vertical section taken on the line 33—33 of Figure 32, Figure 34 is a horizontal section taken on the line 34—34 of Figure 32 with certain parts removed, Figure 35 is a horizontal section taken on the line 35—35 of Figure 33, Figure 36 is a perspective view of the right hand upright of the collating frame, showing the pinion rack attached thereto, Figures 37 and 38 are perspective views showing the interchangeable rack bars, Figure 39 is a perspective view of a lever arm and link connection employed in the manual means for line spacing the work sheets, Figure 40 is a perspective view of a bell crank lever employed in said means, Figure 41 is a perspective view of the pivot pin employed for said bell crank lever, and Figure 42 is a perspective view showing the construction and mounting of the platen and bail together with the operating connections therefor.

Like reference numerals designate corresponding parts throughout the several figures of the drawings.

The invention as illustrated in the accompanying drawings is shown as being applied to the well known standard Royal typewriting machine, but it is to be understood that the invention is adapted to be applied to other types of typewriting machines, or to calculating machines or the like.

The machine, as disclosed, includes a main frame A having a rear wall 5, a carriage B having end plates 6, 7, a platen C, a main ribbon D, and type bars E which are operated in the usual manner.

The front portion of the carriage B is supported on the main frame by upper and lower rails 8 and 9, and the rear portion is supported on a horizontal rail 10 which is located in rear of the rear wall 5 of the main frame A. The rail 10 is mounted on hanger brackets 11, 11 attached to the main frame, through the medium of independently and vertically adjustable connections whereby the rail 10 may be adjusted in parallelism with the front rails 8, 9. Each of these adjustable connections includes a depending Z-shaped bracket 12 having its upper arm 13 rigidly secured to the rail and its lower arm 14 positioned below an offset arm 15 formed integral with the lower end of the bracket 11. A vertical adjusting screw 16 engages the arms 14 and 15, and a clamping screw 17 passes through a vertical slot 19 in the connecting portion 20 of the bracket 12 and into a lug 21 integral with the hanger bracket 11, and functions to clamp the bracket 12 in a vertically adjusted position. The carriage B overhangs the rear wall 5 of the main frame A, and the end plates 6, 7 thereof include depending legs 22, 23 which are disposed above the rail 10 and terminate at their lower ends in spaced relation thereto. A horizontal angle-bar support 24 which includes a base 25 and a vertical wall 26, is rigidly secured at its ends to the lower ends of the legs 22, 23 of the carriage end plates. Spaced U-shaped brackets 27, 27 which respectively include a vertical connecting portion 28 and rearwardly extending upper and lower arms 29, 30 are rigidly secured by the upper arms to the base 25 of the support 24, the lower arms being positioned below and in free sliding contact with the rail 10. Rollers 31 are journaled on angularly adjustable bushings 32 which are eccentrically mounted on the connecting portions 28 above the rail 10 for rolling contact with the latter. Thus, by the above means the rear portion of the carriage B is freely supported on the rail 10, and is held against upward movement by the arms 30 which underlie the rail. It will be also observed that by means of the adjustable eccentric bushings, the sliding contact between the rail 10 and the arms 30 may be adjusted to a nicety.

A supply of paper work sheets or webs W of indeterminate length are positioned in rear of the machine, and the lead-in ends of the sheets are directed upwardly over a horizontal roller 33 which is mounted on the rear ends of arms 34, 35 integral with and projecting rearwardly beyond the depending legs 22, 23 of the carriage end plates. The lead-in ends of the work sheets are then directed forwardly through spaced horizontal guides 36 supported on the upper part of the carriage, then over a horizontal roller 37 supported on the end plates of the carriage immediately in front of the guide 36, thence forwardly and downwardly under a horizontal guide roller 38 supported by the end plates of the carriage and located below the platen C, and thence upwardly in front of the platen and in rear of the main ribbon D to a truck, clamp or guide F wherein they are removably clamped, the truck being mounted for line-spacing movements on a vertically disposed stationary collating frame G located above the platen and supported by the end plates of the carriage.

Carbon strips S which are located between the work sheets W extend along the writing line of the platen C, and are intermittently fed across the work sheets by a mechanism which will be described hereinafter.

The platen C which is of the cylinder type is not mounted for intermittent line-spacing rotary movements as in the usual typewriting machines, but instead is eccentrically mounted for backward and forward swinging movements only, as shown particularly in Figures 14 to 18. To this end, the cylinder 39 of the platen is provided at its ends with circular heads 40, 41 having eccentrically positioned longitudinal bearing hubs 42, 43 for receiving a shaft 44 which is fixedly secured in said hubs by screws 45. The cylinder 39 is attached at its ends to the heads 40, 41 by split clamps 46, 47 which when released permit the cylinder to be angularly adjusted with respect to said heads whenever it is desired to change the position of the writing place on the platen. The ends of the shaft project beyond the hubs and are journaled in bearings 48, 49 which are rigidly secured to and project inwardly from the end plates 6, 7 of the carriage B. Rigidly attached to the hub 43 is a rock arm 50 as shown in Figs. 14, 15 and 16 particularly, and pivotally connected as at 51 to said rock arm is the forward end of a link 52. The rear end of the link 52 is pivotally connected as at 53 to the arm 54 of a 3-armed lever 55 fixed to the right hand end of a rock shaft 56 which is journaled at its ends in the end plates 6, 7 of the carriage. The platen C is positively rocked to its rearmost or non-writing position by means of a manually operable carriage return lever 57 which is fulcrumed as at 58 to oscillate about a vertical axis on a horizontal bracket 59 (Fig. 5) which is rigidly secured to and extends outwardly from the front portion of the left end wall 6 of the carriage A. The inner end of the lever 57 is provided with a cam head 60, the cam edge portion 60a engaging a roller 61 mounted on a lever 62 which is pivoted at one end as at 63 to the bracket 59. A link 64 is pivotally connected at its front end as at 65 to the lever 62, and is pivotally connected at its rear end as at 66 to the lower arm 67 of a lever 68 which is fixed to the rock shaft 56. Thus when the operator swings the carriage return lever 57 to the right (or to the left as shown in Fig. 1) the lever 62 will effect a rocking of the shaft 56, which through the medium of the lever 55, link 52, and rock arm 50 will rock the platen C from its forward or operative position as shown in Figure 14 to its rearward or inoperative position as shown in Fig. 16.

As above stated, the swinging of the carriage return lever 57 to the right (or to the left as viewed in Fig. 1) effects a rearward movement of the platen C to its inoperative position. Upon release of the carriage return lever by the operator, said lever and platen together with the operating connections therebetween, will be returned automatically to their initial positions. To this end, as shown in Figs. 4, 5 and 14, the lever 55 which is fixed to the rock shaft 56 is provided with a forwardly extending rock arm 69 having a roller 70 journaled thereon. A bell crank lever 71 is pivoted at its angle as at 72 on the end plate 7 of the carriage B in front of the rock arm 69. One arm 73 of the bell crank lever 71 extends rearwardly and is provided with a fork 74 which slidably engages the roller 70. The other arm 75 of the bell crank lever 71 extends downwardly and is connected to the forward end of a coil spring 76 whose rear end is anchored to the end plate 23 of the carriage. Thus upon release of the carriage return lever 57, the spring 76 will through the medium of the bell crank lever 71 and arm 69 return not only the rock shaft 56 to its initial position, but also the platen C and the carriage return lever 57 to their initial positions.

It will be observed that the platen is eccentrically mounted to rock about a fixed horizontal axis; that said axis is located within a circle having for its center the center of the arcuate face of the platen and therefore the axis is located eccentrically within the periphery of the platen; that when the platen is in its operative or writing position, the major axis of the eccentrically mounted platen lies in a horizontal plane containing both the axis of the platen and the line of writing of the platen, and consequently the force of type impact against the platen will be directed against the fixed axis of the platen; that when the platen is in its operative or writing position, as shown in Fig. 6, the writing line of the platen will be located in front of a plane containing the guide roller 38 and the line spacing truck F and consequently the work sheets W are bowed forwardly and have relatively tight contact with the platen and that as a result the carbon strips S between the work sheets will be correspondingly bowed; that the platen is rocked upwardly and rearwardly through an arc of approximately 90 degrees from its writing or operative position to its non-writing or inoperative position as shown in Fig. 9, whereby in the latter position the front horizontal line of the platen will be located at a point considerably in rear of the position of the platen writing line when the latter is in its operative position; and that when the platen is in its inoperative position, the work sheets W and carbon strips S will be relieved of their relatively tight contact relation with the platen and the carbon strips will return to their normal or flat relation, whereby the work sheets may be line spaced without dragging the carbon strips upwardly therewith and whereby the carbon strips may be fed freely through the work sheets.

It will be observed that when the platen C is in its operative or writing position, the work sheets W would normally extend upwardly from the writing line of the platen to the work clamp F. Consequently the work sheets directly above the writing line of the platen would be spaced from the platen surface. Thus when lower case types are being employed for printing, the upper case types would strike the work sheets directly above the writing line on the platen, and result in slight impressions being made on the work sheets by the upper case types. Furthermore, by reason of the work sheets being spaced from the platen directly above the writing line, the upper portions of the lower case types would not strike the work sheets with the same force as the lower portions of the lower case types and uneven impressions would be made on the work sheets. Means are therefore provided for curving or positioning the work sheets and the carbon strips directly above the writing line of the platen into relatively tight contact relation with the platen at the time when said platen is being returned to its operative or writing position, and to relieve said relatively tight contact relation of the work sheets and carbon strips with the platen when the latter is being moved rearwardly to its inoperative position whereby the work sheets may be line spaced upwardly by movement of the truck F without dragging the carbon strips upwardly therewith, and whereby said carbon strips may be fed freely through the work sheets. To this end, I have provided a U-shaped positioning bail 77 comprising a work sheet engaging base or arm 78, and spaced rearwardly extending arms 79, 80, the base 78 being coextensive with the platen and disposed in front of the work sheets and extending beyond the side edges thereof, and the arms 79, 80 extending rearwardly past the side edges of the work sheets and having sliding contact with the heads 40, 41 of the platen. Located in the rear of the platen is a brace rod 81 secured to the supporting arms 82, 82 which are mounted on the inner faces of the carriage end plates 6, 7. Pivoted on the supporting arms 82, 82 by shoulder screws 83, 83 and spaced apart are upwardly extending operating arms 84, 85 to which are pivotally connected at their upper or free ends as at 86, 87 the free or rear ends of the arms 79, 80 of the positioning bail 77. As shown in Fig. 13, the arm 84 is pivotally connected as at 88 to the forward end of a link 89 having its rear end pivotally connected as at 90 to the upper arm 91 of the lever 68 which is fixed to the rock shaft 56. As shown in Fig. 14, the arm 85 is pivotally connected as at 92 to the forward end of a link 93 having its rear end pivotally connected as at 94 to the upper arm 95 of the lever 55 which is fixed to the rock shaft 56. It will therefore be seen that when the shaft 56 is rocked by movement of the carriage return lever 57 to the right, the operating arms 84, 85 will be swung forwardly and the positioning bail 77 will be moved forwardly, and that when the carriage return lever is released and returned to its initial position by the spring 76, the operating arms 84, 85 will be swung rearwardly and the positioning bail 77 will be moved rearwardly to its normal or operative position. It will also be observed that the rock shaft 56 is the common driving element for both the platen C and the positioning bail 77;

that when the platen is moved rearwardly the bail will be moved forwardly simultaneously to thereby cooperate with the platen movement and relieve the work sheets W from their relatively tight contact relation with the platen, and that the platen and the bail are respectively moved simultaneously forwardly and rearwardly to their normal or operative positions at which time the positioning bail 77 retains the work sheets directly above the writing line of the platen in spaced relation to the upper types when the lower types are being employed, and also to insure good printing when the upper types are employed.

The positioning bail 77 is yieldably held in sliding contact with the heads 40, 41 of the platen by coil springs 96, 97 which are located in front of the pivots 86, 87 and have their upper ends connected to the arms 79, 80 of the bail and their lower ends connected to lugs 98, 99 respectively formed on the upper ends of operating arms 83, 84. By having the arms 79, 80 of the positioning bail resting on the heads 40, 41 of the platen, the vertical position of the base 78 of the bail is always maintained when said bail is in its operative position.

The positioning bail 77 may be swung upwardly and rearwardly to the dotted line position shown in Fig. 13 to permit the work sheets W to be pulled forwardly when loading the machine for the purpose of interleaving the carbon strips S in said work sheets, or to make erasures on the work sheets. The upward and rearward movement of the positioning bail is limited by laterally extending stop ears 100, 101 respectively formed on the arms 84, 85 and engageable by the arms 79, 80 of the positioning bail. It will be observed that when the positioning bail 77 is swung upwardly to its inoperative position the springs 96, 97 will cross the pivots 86, 87 which connect the bail 77 and arms 84, 85 and thereby retain the positioning bail in said upward position.

The collating frame G comprises two spaced channel shaped side bars or standards 102, 103 which are rigidly although removably connected at their upper ends by a cross bar 104 by means of screws 105, 106 and have their lower ends fixed to the bearings 48, 49 of the platen C. Rearwardly and downwardly inclined braces 107, 108, are rigidly although removably connected at their upper ends to the side bars by screws 109, 110, and are rigidly connected at their lower ends by screws 111, 112 to the end plates 6, 7 of the carriage B, to thereby retain the collating frame in a vertical and stationary position.

The rock arm 50 of the platen is provided with an adjustable stop screw 50a (Figs. 14, 15 and 16) which cooperates with the adjacent standard 103 of the stationary collating frame G to thereby variably limit the forward or operative position of the platen C.

It will be observed that the positioning bail 77 is located between the side bars 102, 103 of the collating frame, and consequently said bail is free to be moved forwardly and backwardly and to be swung upwardly and rearwardly without interfering with the collating frame.

The truck F is line spaced upwardly along the collating frame G by the carriage return lever 57 in timed relation with the backward and forward movements of the platen C and positioning bail 77. The truck F together with the connections between the truck and the carriage return lever 57 are disclosed generally in the patent to Degener 1,853,761, Apr. 12, 1932.

The truck or clamp F (Figure 33) includes a relatively stationary clamping plate x and a relatively movable clamping plate y between which the lead-in ends of the work sheets W are adapted to be clamped. A manually operable means including a cam 113 and a finger lever 113a is mounted on the truck for moving the movable clamping plate y against the tension of a spring 114 when it is desired to insert the work sheets in the clamp, or to release them therefrom. The truck also carries a horizontal shaft 115 having pinions 116, 117 thereon which engage vertical rack bars 118, 119 fixed to the inner flanges of the side bars for maintaining the truck in its horizontal position when being moved upwardly or downwardly along the collating frame.

Removably attached to the outer flange of the standard 102 by screws 120, 120 is a stationary and longitudinally extending ratchet bar 121 having ratchet teeth 122 along its rear face. A lifting bar 123 is slidably mounted on the side bar 102 between the rack 118 and the stationary ratchet bar 121 for longitudinal movements relative thereto, and is provided with ratchet teeth 124 along its rear face. The lifting bar 123 is provided with spaced upper and lower pairs of guide flanges 125, 125 and 126, 126, and upper and lower pairs of guide pins 127, 127 and 128, 128 are respectively mounted on the stationary rack bar 118 and the stationary ratchet bar 121 for retaining the lifting bar 123 in place.

A bracket plate 129 (Figs. 32, 33 and 35) is rigidly connected to the truck or clamp F and extends rearwardly of the side bar 102 of the collating frame. A lifting pawl 130 and a holding pawl 131 are fulcrumed on a pin 132 fixed to the bracket plate 129, the lifting pawl 130 engaging the teeth of the ratchet lifting bar 123 and the holding pawl 131 engaging the teeth of the stationary ratchet bar 121. These pawls are normally held in engagement with the teeth of said ratchet bars by means of coil springs 133 and 134. It will thus be seen that when the lifting bar 123 is elevated, the lifting pawl 130 will cause the truck F to be correspondingly elevated and when pressure is released from the lifting bar the holding pawl 131 will retain the truck in its elevated position. The distance between any two adjacent teeth of the lifting bar corresponds to the distance of a single space and it will therefore be apparent that as the truck or clamp F is elevated step-by-step the work sheets W will be correspondingly line spaced.

A manually operable means including finger pieces 135, 136 is mounted on the truck F for releasing the pawls 130, 131 whereby the truck may be lowered by gravity to the bottom of the collating frame G whenever it is desired to have the truck engage the next form on the work sheet.

The lower end of the lifting bar 123 is connected by a link 137 to a headless stud 137a mounted on the horizontal arm 138 of a bell crank lever 139 which is fulcrumed on a horizontal bearing pin 140 affixed on the end plate 6 of the carriage B. (See Figs. 13, 33, 38 and 40.) The upwardly extending or vertical arm 141 of said bell crank lever 139 is connected by an adjustable eccentric pivot 142 to the rear end of a link 143. (See Figs. 13 and 33.) The front end of the link 143 is pivotally connected as at 144 to a lever 145 which is fulcrumed on the pivot 63 on the shelf 59. (See Figs. 5 and 39.) The lever 145 is provided with a forwardly extending arm 146 which terminates in an upturned toe 147. When the carriage return lever 57 is released, the spring 76 will effect a return of the positioning bail 77 and the platen C together with the lever 62 to their initial positions, and the lifting bar 123 will gravitate to its initial position and thereby effect a return of the lever 145 to its initial position.

Journaled on the cam head 60 of the carriage return lever 57 is a roller 148 which, when the lever 57 is in its normal position, is spaced a considerable distance from the toe 147 of the lever 145 and will not contact said toe until after the lever 57 has actuated the lever 62 to effect the forward movement of the positioning bail 77 and the rearward movement of the platen C. After the roller 61 leaves the cam edge 60a of the carriage return lever 57, it contacts a concentric edge portion or dwell 60b. Thus upon continued movement of the carriage return lever to the right, the lever 145 will be actuated while the lever 62 will be idle. As a result of this timing of the parts, the positioning bail 77 and the platen C will remain in their inoperative positions during the line spacing movement of the truck or clamp F, or in other words, the line spacing of the work sheets will occur subsequent to the platen and the positioning bail being respectively moved rearwardly and forwardly to relieve the normal tight contact relation of the work sheets and carbon strips with the platen. When the carriage return lever 57 is released, the spring 76 will effect a return of the positioning bail 77 and the platen C together with the lever 62 to their initial positions, and the lifting bar 123 will gravitate to its initial position and thereby effect a return of the lever 145 to its initial position.

In the event that it is desired to employ a new form of work sheet W of different line spacing, it will be necessary to substitute a new ratchet bar 121 and a new lifting bar 123 having teeth of different pitch. This is accomplished by removing the screws 120 from the stationary ratchet bar 121 and sliding the link 137 laterally off the headless stud 137a, and then removing the lifting bar 123 and the stationary ratchet bar 121 through the top of the collating frame G. This removal of the bars 121 and 123 can be effected only after the cross bar 104 and the braces 107 have been partly disassembled by removing the screws 105, 106, 109, and 110. It will be understood that the pawls 130, 131 will be held out of engagement with the teeth of said bars 121, 123 during the time the substitution is being made. It will also be observed that by means of the adjustable eccentric pivot 142 the amount of lifting movement imparted to the lifting bar 123 may be adjusted to conform to the line spacing arrangement of the new work sheet W.

The carbon strips S are unwound from spool assemblies s which are journaled on a frame 149 which is mounted on the rear of the carriage B for horizontal forward and backward movements transversely of the machine.

The spool frame 149 comprises a vertically disposed skeleton sheet metal plate 150 having a base flange 151 and horizontal bearing slots 152, 152 formed in its ends adjacent the lower edge thereof for receiving double flanged rollers 153, 153 journaled on the vertical wall 26 of the horizontal support 24. The frame 149 is supported by the rollers 153 above and in spaced relation to the base 25 of the support 24. The legs 22, 23 of the carriage B are respectively provided with inwardly extending bracket arms 154, 155 (Fig. 12) which lie directly in rear of the upper end portions of the frame plate 150, and are provided with rearwardly projecting horizontal ears 156, 157 which overlie the plate 150. Guide rollers 158, 158 are journaled on the under side of the ears in rear of the plate 150 for rolling contact with said plate whereby the latter is retained in its vertical plane. The plate is provided along its upper edge with a rearwardly extending flange 159 which terminates at its ends in spaced relation to the ears 156, 157. The spool frame 149 is movable longitudinally with respect to the carriage B for a limited distance. The left hand end of the base flange 151 of the plate as viewed in Fig. 2, is normally held against an adjustable eccentric back stop 160 (Figs. 2, 12 and 30) which is mounted on the base flange 25 of the support 24. The right hand end of the base flange 151 is normally spaced from but is adapted to contact a front stop screw 161 which is adjustably mounted in an upturned ear 162 located at the end of the base flange 25.

As illustrated in the drawings, and particularly in Figure 1, nine carbon strip spool assemblies s are shown as being arranged in three sets, the sets being arranged in tandem and each set containing three spools.

Each spool assembly (Figs. 27, 28 and 29) includes a sheet metal circular disc 163 having a toothed periphery 164 and a concentric hollow hub 165 of metal which includes an inner annulus 166 and an outer annulus 167, the latter being provided with a plurality of openings 168 forming resultant longitudinal bars 169. The carbon strips S are respectively attached to and rolled tightly on paper tubes 170 to prevent the rolls from slipping around the tubes when extra pull or tension is applied by a tension regulator which will be fully described hereinafter, the tubes being mounted on the hubs 165. Mounted in each hollow hub 165 is a pair of spring pressed fingers 171 having teeth 172 at one end for engaging the paper tubes 170 to prevent relative rotation between the hubs and the tubes. The spool assemblies are journaled on three horizontal shafts 173 which are clamped to the spool supporting plate 150 and project rearwardly therefrom, there being three spool assemblies journaled on each shaft. Each shaft 173 is provided at its outer end with a circumferential groove 174, and with a longitudinal groove 175. A spacing collar 176 is attached to the inner end of each shaft directly in rear of and in contact with the plate 150. Three brake shoes 177 are separately mounted in each longitudinal groove 175 for cooperation with the respective spool assemblies to impose frictional resistance to thereby retain said assemblies against free rotation on the shaft. Each brake shoe is as long as the width of the spool, and the upper front corner is rounded as at 178 to form a cam. Each brake shoe 177 is provided with a centrally disposed and downwardly extending guide pin 179 which slides in a transverse bore 180 formed in the shaft 173. One end of the bore registers with the longitudinal groove 175 and the other end is formed with a counterbore forming a resultant seat 181 adapted for cooperation with a head 182 on the guide pin 179 to limit the outward movement of the brake shoe. Coil springs 183, 183 are seated in radial bores 184, 184 formed in the shaft on opposite sides of the guide pin 179, the bores registering with the longitudinal groove 175 and the springs bearing against the under face of the brake shoe. The springs normally urge the brake shoe outwardly into frictional contact with the inner face of the hub 165. The three spool assemblies are adapted to be positioned on the shaft one at a time, and during this loading operation the front edge of the hub of the assembly will engage the corner cam 178 and thereby force the brake shoes inwardly below the periphery of the shaft. Should one (or two) assembly only be placed on the shaft, the rear brake shoe (or shoes) will return to its normal position and form a resultant stop for the assembly to retain the latter against longitudinal displacement towards the rear end of the shaft.

Also clamped to the spool supporting plate 150 below and at one side of the spool shafts 173, are three horizontal bearing shafts 185. On each shaft 185 are journaled three upwardly extending locking pawls 186 having laterally extending hubs 187 which serve to space the pawls and retain the same in alinement with the teeth 164 of the spool discs 163. Each pawl 186 includes a nose 186a adapted for engagement with the teeth of the associated disc 163, and an arm 188 which projects upwardly beyond the nose. Coil springs 189 are connected at one end to the pawls 186, and the other ends of the springs are connected to an anchor bar 190 which is secured to and projects rearwardly from the spool supporting plate 150, the springs functioning to normally urge the noses 187 of the pawls into locking or holding engagements with the teeth 164 of the discs 163 for holding said discs against movement. The rear end of each anchor bar 190 is bent laterally as at 191 and is fastened to the free end of the associated bearing shaft 185 by a shoulder screw 192.

When the parts are in normal positions, the pawls 186 are held out of engagement with the associated discs 163, but when the carriage return lever 157 is actuated the pawls are released to permit the springs 189 to swing the pawls into locking engagements with the discs and thereby retain the spool assemblies against rotation on the shafts 173. To this end, universal bails 193, 194 and 195 are respectively associated with the three sets of pawls, the bails 193 and 194 being of like construction and each comprising spaced front and rear lever arms 196, 196a which are fulcrumed on the associated shafts 185, a horizontal bail rod 197 which connects said lever arms and extends in advance of the arms 188 of the three associated pawls, and a tie rod 198 which also connects said lever arms. The bail 195 includes spaced front and rear lever arms 199, 200 which are fulcrumed on the associated shaft 185, a connecting bail rod 201 which extends in advance of the arms 188 of the associated pawls, and a tie rod 202 which also connects said lever arms. The bail rods 197, 197 and 201 engage the pawls and normally retain them out of locking engagements with the discs 163. The rear lever arm 200 passes through a slot 203 in the top flange 159 of the spool supporting plate 150. A horizontal push rod 204 is pivotally connected at one end as at 205 with the lever arm 200 and is supported adjacent its other end by a pin 206 fixed thereto and having sliding engagement in a horizontal slot 207 formed in the plate 150. The free end of the push rod 204 is provided with an ear 208 which is disposed in contact with the front lever arm 196a of the bail 193. The push rod 204 intermediate its ends is provided with an ear 209 which is disposed in advance of and in contact with the front lever 196a of the bail 194. It will be apparent from an inspection of Fig. 2 that when the lever arm 200 is moved to the right, the push rod 204 will be also moved to the right, and consequently the three bail rods 197, 197 and 201 will be moved by the springs 189 to effect locking engagements between the pawls and the spool discs 163. It will be also apparent that when the lever arm 200 is moved to the left, the push rod 204 will cause the bail rods to withdraw the pawls from the discs. This engagement and release of the pawls is effected by movement of the carriage return lever 157 by means of a link 210 which is pivotally connected at its forward end as at 211 to the link 64 and at its rear end to one arm of a bell crank lever 212 which is fulcrumed at its angle as at 213 to the ear 156 of the spool supporting plate 150, the other arm of said bell crank lever being connected by a link 214 to the upper end of the lever arm 200. The lever arm 200 is limited in its push direction by an adjustable eccentric stop 215 mounted on the spool plate 150.

It will be understood that when the carriage return lever is in its normal position, the pawls 186 are disengaged from the spool discs 163, and that when the lever 57 is moved the platen C and the positioning bail 77 will be moved simultaneously to their inoperative positions and the pawls 186 will be also moved into locking engagements with the spool discs.

The spool supporting plate 150 is normally retained against the stop 160 by an adjustable tensioning means X. (See Figures 30 and 31.) This means includes an ear 216 which extends forwardly from the plate 150, a pin 217 which is provided with a flat 218 slidably mounted in a D-opening 219 in the depending leg 23 of the carriage end plate 7 and having a threaded outer end 220, a coil spring 221 which is connected to the ear 216 and to the inner end of the pin 217, and a nut 222 which is threaded onto the outer end of the pin for contact with said end plate 7. Thus by adjusting the nut 222 the tension of the spring 221 may be regulated and without turning the pin 217.

The carbon strips S of the respective sets of spool assemblies are led from the spools around horizontal guide pins 223 which are fixed to and extend rearwardly from the spool plate 150; thence around three sets of vertical rolls 224 mounted on a shelf 225 attached to the end plate 6 of the carriage, the sets being arranged in alinement with the spools and in offset or diagonal relation, and each set including three rolls arranged in a row; thence forwardly towards the carriage return lever 57; thence around a single roll 226 mounted on the front end of the shelf 225; thence along in front of the platen C and in interleaved relation with the work sheets W; thence around a single roll 227 mounted on a shelf 228 on the carriage end plate 6, and thence rearwardly to a strip feeding mechanism Y which is mounted on the shelf 228 and is identical with that shown in the Degener Patent 1,853,761, said feeding means including a pair of feed rollers 229, 229 which are positively actuated through the medium of a link 230 (Fig. 4) connected to the bell crank lever 71 each time the carriage return lever 57 is swung to the right.

The outer end of each spool shaft 173 and the outer end of its associated pawl shaft 185 are conjointly supported by a latch 231 comprising two downwardly extending arms 232, 233. The latch is pivoted as at 234 to the rear end of the associated ribbon guide pin 223, and the free ends of the arms are respectively provided with throats 235, 236 for respectively engaging in the annular groove 174 of the spool shaft 173 and the screw 192 of the pawl shaft 185.

In operation, reference should be made to the diagrammatic Figures 6 to 11 inclusive and to the associated Figs. 21 to 26 inclusive. It will be assumed that the parts are in their normal positions in which the carriage return lever 57 is at the point a, and that it is desirable to feed the carbon strips S and to line space the work sheets W. For these purposes, the lever is swung to the right, as viewed by the operator, from the starting point a to the ending point e.

While the lever 57 is being moved from the point a to the point b, (Figs. 6, 7, 21 and 22), the lever 62 will be actuated and the shaft 56 will be partially rocked through the medium of the link 64. This rocking of this shaft will start the forward movement of the bail 77 and the rearward movement of the platen to relieve their normal tight contact relation with the work sheets W, and will also start the operation of the feeding means Y for the carbon strips S. The spool assemblies s will at the same time become locked by the pawls 186 by reason of the actuating arm 200 being link connected to the link 64. It will be noted (Fig. 7) that the roller 61 on the lever 62 has traveled approximately to the center of the cam edge 60a of the carriage return lever 57.

While the lever 57 is being moved from the point b to the point c, (Figs. 7, 8, 22, 23), the bail 77 will continue its forward movement and the platen C will continue its rearward movement to further relieve their normal tight contact relation with the work sheets W. Furthermore, inasmuch as the spool assemblies s have been previously locked against feeding rotation, the continued operation of the strip feeding means Y will create a pull on the strips S and consequently the spool carrying plate or frame 149 together with the locked spools, will be moved against the tension of the spring 221 until the end of the frame 149 contacts the adjustable stop screw 161. It will be noted (Fig. 8) that at this time, the cam edge 60a of the carriage return lever 57 is just about in position to leave the roller 61 which is mounted on the lever 62.

While the lever 57 is being moved from the point c to the point d (Figs. 8, 9, 23, 24) the roller 61 of the lever 62 passes into contact with the concentric edge or dwell portion 60b of the lever 57; that the platen C and bail 77 have completed their rearward and forward movements respectively to completely free the work sheets W and the interleaved carbon strips S; and that the last part of the operation of the feeding means Y imparts a final stretch to the carbon strips.

While the lever 57 is being moved from the point d to the point e (Figs. 9, 10, 24, 25) the roller 61 of the lever 62 is in contact with the dwell portion 60b of the lever 57 and consequently said lever 57 does not transmit any movement to the platen C, to the bail 77, to the strip feeding means Y, or to the spool carrying frame 149. The movement of the lever 57, however, causes the roller 148 thereon to contact the toe 147 of the lever 145 and thereby elevate the truck or clamp F to effect a line spacing movement to the work sheets W. It will be noted that this line spacing of the work sheets is effected subsequent to the platen C and the bail 77 being fully moved to their inoperative positions and subsequent to the completion of the operation of the ribbon feeding means Y, so that the work sheets will be line spaced while the sheets are free from the platen and the bail and while the interleaved carbon strips are stationary and taut. This condition permits the work sheets to be line spaced without dragging the carbon strips upwardly therewith and also avoids the sheets becoming smutted by the strips.

The carriage B may then be shifted, if desired, by a continued pressure on the carriage return lever 57 in the same direction.

Upon release of the lever 57, and while the lever is moving from the point e to the point a, the spring 76 (Fig. 4) will effect a return of the operating parts including said lever. This spring functions through the bell crank lever 71 to return the rock shaft 56 to its initial position, and the rock shaft returns the platen C, and the bail 77 to their normal positions. When the lever 57 reaches the point b, (Fig. 11), the pawls 186 will be disengaged from the spool discs 163, and the spring 221 will then return the spool carrying frame 149 to its initial position against the adjustable stop 160. It will be noted that the free ends of the strips S are clamped between the feeding rolls 229, and consequently the return movement of the frame 149 will cause the carbon strips S to unwind from their spools against the tensions of the brake shoes 177 an amount equal to that which was previously fed through the work sheets.

From the foregoing it will be observed that the eccentric axis of the platen is located within a circle prescribed by the arcuate writing line of the platen and consequently the rearward and upward movement of the platen is fast and the normal tight contact relation between the work sheets and the platen is relieved in a very rapid manner so as to permit the carbon strips to be fed through the work sheets with a minimum amount of friction; that the major axis of the platen contains the writing line of the platen and consequently the force of impact by the type bars will be directed against the fixed axis of the platen; that the positioning bail functions normally to prevent the upper types from contacting the work sheets, and is movable forwardly in timed relation with the rearward movement of the platen to free the work sheets prior to the strip feeding operation and prior to the line spacing movement of the work sheets; that the spool locking means is normally ineffective; that during the feeding operation of the carbon strips the spool carrying frame including the locked spools, is moved relative to the carriage against the tension of the frame-retaining spring in order to give a drag or tension to the strips; that the carriage return lever is movable in one direction to render the spool locking means effective, to effect a rearward movement of the platen and a forward movement of the positioning bail, to operate the strip feeding means to effect a forward travel of the spool carrying frame against the tension of its retaining spring, and to effect a line spacing operation to the work sheets; that the carriage return lever is movable in the opposite direction to effect the return of the platen and bail to their normal positions, and to release the spool locking means whereby the retaining spring will return the spool carrying frame to its initial position and thereby unwind the strip from the spool; that the strips are unwound from their spools during the latter part of the return movement of the carriage return lever; that a 2-armed latch is provided for each spool to support the outer end of the spool shaft and also the outer end of the associated pawl bearing shaft; that a plurality of sets of guides are provided for turning the carbon strips as they leave the spools, the sets being respectively arranged in alinement with the spools and offset from one another to thereby insure not only ease of loading but also to reduce contact between the strips to a minimum; that the ratchet bars of the line spacing mechanism may be readily removed and others substituted whenever it is desired to vary the amount of line space imparted to the work sheets; that the tension spring for the spool carrying frame serves to return the frame, to impart tensions to the strips during the feeding movement thereof and to effect an unwinding of the spools during the return movement of the frame; that the tension spring is adjustable to vary its tension in conformity with the number of spools employed; that the carbon strips are always under a constant and uniform tension, regardless of the variations in the diameters of the spools, because of the fact that a single tensioning spring is common to all of the spools; that each spool assembly includes a metal core, a paper tube, a carbon strip roll, and spool flanges, and constitutes a single unit which is mounted on a bearing shaft; that brake shoes which are mounted in the bearing shafts for effecting a constant braking action against the metal core of the units, also function to prevent any overthrow being imparted to the units when the spool carrying frame returns to its initial position against its back stop; that the front stop for the spool carrying frame is adjustable for the purpose of determining the needed amount of forward travel of the spool carrying frame; and that the carbon strips are always under constant tension.

It is of course to be understood that the details of structure and arrangement of parts may be variously changed and modified without departing from the spirit and scope of my invention.

I claim:

1. In a typewriting machine, the combination with a carriage including a platen; of a carbon strip spool journaled on the carriage; a strip feeding means mounted on the carriage; means for guiding the strip from the spool along and in front of the platen to the feeding means; and means for first operating the feeding means and for subsequently effecting an unwinding of the strip from the spool.

2. In a typewriting machine, the combination with a carriage including a platen; of a carbon strip spool journaled on the carriage; a strip feeding means mounted on the carriage; means for guiding the strip from the spool along and in front of the platen to the feeding means; normally ineffective means for locking the spool against unwinding; and means for rendering said spool locking means effective, for operating the feeding means and for bodily moving the locked spool by the strip, for subsequently effecting an unlocking of the spool, and for effecting a return of the unlocked spool to its initial position and simultaneously effecting the unwinding of the strip from the spool.

3. In a typewriting machine, the combination with a carriage including a platen; of a frame mounted on the carriage for forward and backward movements; a carbon strip spool journaled on the frame; yieldable means for retaining the frame against forward movement; a strip feeding means mounted on the carriage; means for guiding the strip from the spool along and in front of the platen to the feeding means; normally ineffective means mounted on the frame for locking the spool against unwinding; and means for rendering said locking means effective, for operating the feeding means to feed the strip and thereby move the frame together with the locked spool against the tension of said yieldable means, and for thereafter releasing said locking means whereby the yieldable means will return the frame to its initial position to thereby effect an unwinding of the strip from the spool.

4. In a typewriting machine, the combination with a carriage including a platen; of a frame mounted on the carriage for forward and backward movements; a back stop mounted on the carriage for limiting the backward movement of the frame; a tensioning means connected to the frame and to the carriage for yieldably retaining the frame against said back stop; a carbon strip spool journaled on the frame; normally ineffective means mounted on the frame for locking the spool against unwinding; a strip feeding means mounted on the carriage; means for guiding the strip from the spool along and in front of the platen to said feeding means; and means for rendering said spool locking means effective, for operating the feeding means to feed the strip and thereby move the frame forwardly together with the locked spool against the tension of said yieldable means, and for thereafter releasing said locking means whereby the yieldable means will return the frame to its initial position to thereby effect an unwinding of the strip from the spool.

5. In a typewriting machine, the combination with a carriage including a platen; of a frame mounted on the carriage for forward and backward movements; an adjustable back stop mounted on the carriage for variably limiting the backward movement of the frame; a tensioning means connected to the frame and to the carriage for yieldably retaining the frame against said back stop; a carbon strip spool journaled on the frame; normally ineffective means mounted on the frame for locking the spool against unwinding; a strip feeding means mounted on the carriage; means for guiding the strip from the spool along and in front of the platen to said feeding means; and means for rendering said spool locking means effective, for operating the feeding means to feed the strip and thereby move the frame forwardly together with the locked spool against the tension of said yieldable means, and for thereafter releasing said locking means whereby the yieldable means will return the frame to its initial position to thereby effect an unwinding of the strip from the spool.

6. In a typewriting machine, the combination with a carriage including a platen; of a frame mounted on the carriage for forward and backward movements; a back stop mounted on the carriage for limiting the backward movement of the frame; a front stop mounted on the carriage for limiting the forward movement of the frame; a tensioning means connected to the frame and to the carriage for yieldably retaining the frame against said back stop; a carbon strip spool journaled on the frame; normally ineffective means mounted on the frame for locking the spool against unwinding; a strip feeding means mounted on the carriage; means for guiding the strip from the spool along and in front of the platen to said feeding means; and means for rendering said spool locking means effective, for operating the feeding means to feed the strip and thereby move the frame forwardly together with the locked spool against the tension of said yieldable means to said front stop, and for thereafter releasing said locking means whereby the yieldable means will return the frame to its initial position to thereby effect an unwinding of the strip from the spool.

7. In a typewriting machine, the combination with a carriage including a platen; of a frame mounted on the carriage for forward and backward movements; a back stop mounted on the carriage for limiting the backward movement of the frame; an adjustable front stop mounted on the carriage for variably limiting the forward movement of the frame; a tensioning means connected to the frame and to the carriage for yieldably retaining the frame against said back stop; a carbon strip spool journaled on the frame; normally ineffective means mounted on the frame for locking the spool against unwinding; a strip feeding means mounted on the carriage; means for guiding the strip from the spool along and in front of the platen to said feeding means; and means for rendering said spool locking means effective, for operating the feeding means to feed the strip and thereby move the frame forwardly together with the locked spool against the tension of said yieldable means to said front stop, and for thereafter releasing said locking means whereby the yieldable means will return the frame to its initial position to thereby effect an unwinding of the strip from the spool.

8. In a typewriting machine, the combination with a carriage including a platen; of a frame mounted on the carriage for forward and backward movements; a back stop mounted on the carriage for limiting the backward movement of the frame; an adjustable tensioning means connected to the frame and to the carriage for variably and yieldably retaining the frame against said back stop; a carbon strip spool journaled on the frame; normally ineffective means mounted on the frame for locking the spool against unwinding; a strip feeding means mounted on the carriage; means for guiding the strip from the spool along and in front of the platen to said feeding means; and means for rendering said spool locking means effective, for operating the feeding means to feed the strip and thereby move the frame forwardly together with the locked spool against the tension of said yieldable means, and for thereafter releasing said locking means whereby the yieldable means will return the frame to its initial position to thereby effect an unwinding of the strip from the spool.

9. In a typewriting machine, the combination with a carriage including a platen; of a carbon strip spool journaled on the carriage; a brake cooperating with the spool for frictionally resisting rotation thereof; a strip feeding means mounted on the carriage; means for guiding the strip from the spool along and in front of the platen to the feeding means; normally ineffective means for locking the spool against unwinding; and means for rendering said spool locking means effective, for operating the feeding means and for bodily moving the locked spool by the strip, for subsequently effecting an unlocking of the spool, and for effecting a return of the unlocked spool to its initial position and simultaneously effecting the unwinding of the strip from the spool against the resistance of said brake.

10. In a typewriting machine, the combination with a carriage including a platen; of a frame mounted on the carriage for forward and backward movements; a carbon strip spool journaled on the frame; a brake cooperating with the spool for frictionally resisting rotation thereof; yieldable means for retaining the frame against forward movement; a strip feeding means mounted on the carriage; means for guiding the strip from the spool along and in front of the platen to the feeding means; normally ineffective means mounted on the frame for locking the spool against unwinding; and means for rendering said locking means effective, for operating the feeding means to feed the strip and thereby move the frame together with the locked spool against the tension of said yieldable means, and for thereafter releasing said locking means whereby the yieldable means will return the frame to its initial position to thereby effect an unwinding of the strip from the spool against the resistance of said brake.

11. In a typewriting machine, the combination with a carriage including a platen; of a carbon strip spool journaled on the carriage; a strip feeding means mounted on the carriage; means for guiding the strip from the spool along and in front of the platen to the feeding means; and means including an operating lever movable in one direction for operating the feeding means and movable in the opposite direction for effecting an unwinding of the strip from the spool.

12. In a typewriting machine, the combination with a carriage including a platen; of a frame mounted on the carriage for forward and backward movements; a carbon strip spool journaled on the frame; yieldable means for retaining the frame against forward movement; a strip feeding means mounted on the carriage; means for guiding the strip from the spool along and in front of the platen to the feeding means; normally ineffective means mounted on the frame for locking the spool against unwinding; and means including an operating lever movable in one direction for rendering said locking means effective and for operating the feeding means to move the frame together with the locked spool by the strip and against the tension of said yieldable retaining means, said lever being movable in the opposite direction for effecting the release of said spool locking means whereby said yieldable retaining means will return the frame to its initial position and thereby effect an unwinding of the strip from the spool.

13. In a typewriting machine, the combination with a carriage including a platen; of a frame mounted on the carriage for forward and backward movements; a back stop mounted on the carriage for limiting the backward movement of the frame; a tensioning means connected to the frame and to the carriage for yieldably retaining the frame against said back stop; a carbon strip spool journaled on the frame; normally ineffective means mounted on the frame for locking the spool against unwinding; a strip feeding means mounted on the carriage; means for guiding the strip from the spool along and in front of the platen to said feeding means; and means including an operating lever movable in one direction for rendering said locking means effective and for operating the feeding means to move the frame together with the locked spool by the strip and against the tension of said yieldable retaining means, said lever being movable in the opposite direction for effecting the release of said spool locking means whereby said yieldable retaining means will return the frame to its initial position against the back stop and thereby effect an unwinding of the strip from the spool.

14. In a typewriting machine, the combination with a carriage including a platen; of a frame mounted on the carriage for forward and backward movements; a back stop mounted on the carriage for limiting the backward movement of the frame; a front stop mounted on the carriage for limiting the forward movement of the frame; a tensioning means connected to the frame and to the carriage for yieldably retaining the frame against said back stop; a carbon strip spool journaled on the frame; normally ineffective means mounted on the frame for locking the spool against unwinding; a strip feeding means mounted on the carriage; means for guiding the strip from the spool along and in front of the platen to said feeding means; and means including an operating lever movable in one direction for rendering said locking means effective and for operating the feeding means to move the frame together with the locked spool by the strip and against the tension of said yieldable retaining means to the front stop, said lever being movable in the opposite direction for effecting the release of said spool locking means whereby said yieldable retaining means will return the frame to its initial position and thereby effect an unwinding of the strip from the spool.

15. In a typewriting machine, the combination with a carriage including a platen; of a frame mounted on the carriage for reciprocatory movements; yieldable means for retaining the frame against movement in one direction; a bearing shaft fixed to said frame; a carbon strip spool assembly journaled on the shaft and including a disc having a toothed periphery; normally ineffective means mounted on the frame for locking the spool assembly against unwinding and including a pawl adapted for co-operation with the teeth of the disc; a strip feeding means mounted on the carriage; means for guiding the strip from the spool assembly along and in front of the platen to said feeding means; and means for rendering said locking means effective, for operating the feeding means to feed the strip and thereby move the frame together with the locked spool assembly against the tension of said yieldable means, and for thereafter releasing said locking means whereby the yieldable means will return the frame to its initial position and thereby effect an unwinding of the strip from the spool assemby.

16. In a typewriting machine, the combination with a carriage including a platen; of a frame mounted on the carriage for reciprocatory movements; yieldable means for retaining the frame against movement in one direction; a bearing shaft fixed to said frame; a carbon strip spool assembly journaled on the shaft and including a disc having a toothed periphery; a locking pawl pivoted on the frame for engagement with the teeth of the disc; a spring normally urging the pawl towards said teeth; means mounted on the frame for normally holding the pawl out of engagement with said teeth; a strip feeding means mounted on the carriage; means for guiding the strip from the spool assembly along and in front of the platen to said feeding means; and means for releasing said pawl holding means to effect a locking of the spool assembly, for operating the feeding means to feed the strip to thereby move the frame together with the locked spool assembly against the tension of said yieldable means, and for thereafter operating said holding means to disengage the pawl from the disc whereby the yieldable means will return the frame to its initial position and thereby effect an unwinding of the strip from the spool assembly.

17. In a typewriting machine, the combination with a carriage including a platen; of a frame mounted on the carriage for reciprocatory movements; an adjustable back stop mounted on the carriage for variably limiting the backward movement of the frame; yieldable means for retaining the frame against movement in one direction; a bearing shaft fixed to said frame; a carbon strip spool assembly journaled on the shaft and including a disc having a toothed periphery; normally ineffective means mounted on the frame for locking the spool assembly against unwinding and including a pawl adapted for co-operation with the teeth of the disc; a strip feeding means mounted on the carriage; means for guiding the strip from the spool assembly along and in front of the platen to said feeding means; and means for rendering said locking means effective; for operating the feeding means to feed the strip and thereby move the frame together with the locked spool assembly against the tension of said yieldable means, and for thereafter releasing said locking means whereby the yieldable means will return the frame to its initial position against the back stop and thereby effect an unwinding of the strip from the spool assembly.

18. In a typewriting machine, the combination with a carriage including a platen; of a frame mounted on the carriage for reciprocatory movements; an adjustable front stop mounted on the carriage for variably limiting the forward movement of the frame; yieldable means for retaining the frame against movement in one direction; a bearing shaft fixed to said frame; a carbon strip spool assembly journaled on the shaft and including a disc having a toothed periphery; normally ineffective means mounted on the frame for locking the spool assembly against unwinding and including a pawl adapted for cooperation with the teeth of the disc; a strip feeding means mounted on the carriage; means for guiding the strip from the spool assembly along and in front of the platen to said feeding means; and means for rendering said locking means effective, for operating the feeding means to feed the strip and thereby move the frame together with the locked spool assembly forwardly against the front stop and against the tension of said yieldable means, and for thereafter releasing said locking means whereby the yieldable means will return the frame to its initial position and thereby effect an unwinding of the strip from the spool assembly.

19. In a typewriting machine, the combination with a carriage including a platen; of a frame mounted on the carriage for reciprocatory movements; an adjustable back stop mounted on the carriage for variably limiting the backward movement of the frame; an adjustable tensioning means connected to the frame and to the carriage for variably and yieldably retaining the frame against the back stop; a bearing shaft fixed to said frame; a carbon strip spool assembly journaled on the shaft and including a disc having a toothed periphery; normally ineffective means mounted on the frame for locking the spool assembly against unwinding and including a pawl adapted for cooperation with the teeth of the disc; a strip feeding means mounted on the carriage; means for guiding the strip from the spool assembly along and in front of the platen to said feeding means; and means for rendering said locking means effective, for operating the feeding means to feed the strip and thereby move the frame together with the locked spool assembly against the tension of said tensioning means, and for thereafter releasing said locking means whereby the tensioning means will return the frame to its initial position against the back stop and thereby effect an unwinding of the strip from the spool assembly.

20. In a typewriting machine, the combination with a carriage including a platen; of a frame mounted on the carriage for reciprocatory movements; yieldable means for retaining the frame against movement in one direction; a bearing shaft fixed to said frame; a carbon strip spool assembly journaled on the shaft; a brake mounted in the shaft for constant frictional engagement with said spool assembly; normally ineffective means mounted on the frame for locking the spool assembly against unwinding; a strip feeding means mounted on the carriage; means for guiding the strip from the spool assembly along and in front of the platen to said feeding means; and means for rendering said locking means effective, for operating the feeding means to feed the strip and thereby move the frame together with the locked spool assembly against the tension of said yieldable means, and for thereafter releasing said locking means whereby the yieldable means will return the frame to its initial position to thereby effect an unwinding of the strip from the spool assembly.

21. In a typewriting machine, the combination with a carriage including a platen; of a frame mounted on the carriage for reciprocatory movements; yieldable means for retaining the frame against movement in one direction; a bearing shaft fixed to said frame; a carbon strip spool assembly journaled on the shaft and including a disc having a toothed periphery; a brake mounted in the shaft for constant frictional engagement with said spool assembly; normally ineffective means mounted on the support for locking the spool assembly against unwinding and including a pawl adapted for cooperation with the teeth of the disc; a strip feeding means mounted on the carriage; means for guiding the strip from the spool assembly along and in front of the platen to said feeding means; and means for rendering said locking means effective, for operating the feeding means to feed the strip and thereby move the frame together with the locked spool assembly against the tension of said yieldable means, and for thereafter releasing said locking means whereby the yieldable means will return the frame to its initial position to thereby effect an unwinding of the strip from the spool assembly.

22. In a typewriting machine, the combination with a carriage including a platen; of a frame mounted on the carriage for reciprocatory movements; yieldable means for retaining the frame against movement in one direction; a bearing shaft fixed to said frame; a carbon strip spool assembly journaled on the shaft and including a disc having a toothed periphery; normally ineffective means mounted on the frame for locking the spool assembly against unwinding and including a pawl adapted for cooperation with the teeth of the disc; a strip feeding means mounted on the carriage; means for guiding the strip from the spool assembly along and in front of the platen to said feeding means; and means including a manually operable lever movable in one direction for rendering said locking means effective and for operating the feeding means to move the frame together with the locked spool assembly by the strip and against the tension of said yieldable retaining means, said lever being movable in the opposite direction for effecting the release of said spool assembly locking means whereby said yieldable retaining means will return the frame to its initial position and thereby effect an unwinding of the strip from the spool assembly.

23. In a typewriting machine, the combination with a carriage including a platen; of a frame mounted on the carriage for reciprocatory movements; yieldable means for retaining the frame against movement in one direction; a bearing shaft fixed to said frame; a carbon strip spool assembly journaled on the shaft and including a disc having a toothed periphery; a locking pawl pivoted on the frame for engagement with the teeth of the disc; a spring normally urging the pawl towards said teeth; means mounted on the frame for normally holding the pawl out of engagement with said teeth; a strip feeding means mounted on the carriage; means for guiding the strip from the spool assembly along and in front of the platen to said feeding means; and means including a manually operable lever movable in one direction for rendering said locking means effective and for operating the feeding means to move the frame together with the locked spool assembly by the strip and against the tension of said yieldable retaining means, said lever being movable in the opposite direction for effecting the release of said spool assembly locking means whereby said yieldable retaining means will return the frame to its initial position and thereby effect an unwinding of the strip from the spool assembly.

24. In a typewriting machine, the combination with a carriage including a platen; of a frame mounted on the carriage for reciprocatory movements; an adjustable back stop mounted on the carriage for variably limiting the backward movement of the frame; yieldable means for retaining the frame against movement in one direction; a bearing shaft fixed to said frame; a carbon strip spool assembly journaled on the shaft and including a disc having a toothed periphery; normally ineffective means mounted on the frame for locking the spool assembly against unwinding and including a pawl adapted for cooperation with the teeth of the disc; a strip feeding means mounted on the carriage; means for guiding the strip from the spool assembly along and in front of the platen to said feeding means; and means including a manually operable lever movable in one direction for rendering said locking means effective and for operating the feeding means to move the frame together with the locked spool assembly by the strip and against the tension of said yieldable retaining means, said lever being movable in the opposite direction for effecting the release of said spool assembly locking means whereby said yieldable retaining means will return the frame to its initial position against the back stop and thereby effect an unwinding of the strip from the spool assembly.

25. In a typewriting machine, the combination with a carriage including a platen; of a frame mounted on the carriage for reciprocatory movements; an adjustable front stop mounted on the carriage for variably limiting the forward movement of the frame; yieldable means for retaining the frame against movement in one direction; a bearing shaft fixed to said frame; a carbon strip spool assembly journaled on the shaft and including a disc having a toothed periphery; normally ineffective means mounted on the frame for locking the spool assembly against unwinding and including a pawl adapted for cooperation with the teeth of the disc; a strip feeding means mounted on the carriage; means for guiding the strip from the spool assembly along and in front of the platen to said feeding means; and means including a manually operable lever movable in one direction for rendering said locking means effective and for operating the feeding means to move the frame together with the locked spool by the strip and against the tension of said yieldable retaining means to the front stop, said lever being movable in the opposite direction for effecting the release of said spool locking means whereby said yieldable retaining means will return the frame to its initial position and thereby effect an unwinding of the strip from the spool.

26. In a typewriting machine, the combination with a carriage including a platen; of a frame mounted on the carriage for reciprocatory movements; yieldable means for retaining the frame against movement in one direction; a plurality of bearing shafts fixed to said frame; a carbon strip spool assembly journaled on each shaft; normally ineffective means for each spool assembly for locking the same against unwinding; a strip feeding means mounted on the carriage; means for guiding the strips from the spool assemblies along and in front of the platen to said feeding means; and means for rendering the locking means simultaneously effective, for operating the feeding means to feed the strips to thereby move the frame together with the locked spool assemblies against the tension of said yieldable means, and for thereafter releasing simultaneously said locking means whereby the yieldable means will return the frame to its initial position and thereby effect the unwinding of the strips from the spool assemblies.

27. In a typewriting machine, the combination with a carriage including a platen; of a frame mounted on the carriage for reciprocatory movements; yieldable means for retaining the frame against movement in one direction; a plurality of bearing shafts fixed to said frame; a carbon strip spool assembly journaled on each shaft and including a disc having a toothed periphery; normally ineffective means for each spool assembly for locking the same against unwinding and including a pawl adapted for cooperation with the teeth of each disc; a strip feeding means mounted on the carriage; means for guiding the strips from the spool assemblies along and in front of the platen to said feeding means; and means for rendering the locking means simultaneously effective, for operating the feeding means to feed the strips to thereby move the frame together with the locked spool assemblies against the tension of said yieldable means, and for thereafter releasing simultaneously said locking means whereby the yieldable means will return the frame to its initial position and thereby effect the unwinding of the strips from the spool assemblies.

28. In a typewriting machine, the combination with a carriage including a platen; of a frame mounted on the carriage for reciprocatory movements; yieldable means for retaining the frame against movement in one direction; a plurality of bearing shafts fixed to said frame; a carbon strip spool assembly journaled on each shaft and including a disc having a toothed periphery; normally ineffective means for each spool assembly for locking the same against unwinding and including a pawl adapted for cooperation with the teeth of each disc; a spring normally urging each pawl toward the teeth of the associated disc; means mounted on the support for normally holding the pawls out of engagement with the teeth of the associated discs; a strip feeding means mounted on the carriage; means for guiding the strips from the spool assemblies along and in front of the platen to said feeding means; and means for releasing simultaneously the pawl holding means to effect a simultaneous locking of the spool assemblies, for operating the feeding means to feed the strips to thereby move the frame together with the locked spool assemblies against the tension of said yieldable means, and to thereafter operate simultaneously said holding means to disengage simultaneously the pawls from the discs whereby the yieldable means will return the frame to its initial position and thereby effect the unwinding of the strips from the spool assemblies.

29. In a typewriting machine, the combination with a carriage including a paten; of a frame mounted on the carriage for reciprocatory movements; an adjustable back stop mounted on the carriage for variably limiting the backward movement of the frame; yieldable means for retaining the frame against movement in one direction; a plurality of bearing shafts fixed to said frame; a carbon strip spool assembly journaled on each shaft; normally ineffective means for each spool assembly for locking the same against unwinding; a strip feeding means mounted on the carriage; means for guiding the strips from the spool assemblies along and in front of the platen to said feeding means; and means for rendering the locking means simultaneously effective, for operating the feeding means to feed the strips to thereby move the frame together with the locked spool assemblies against the tension of said yieldable means, and for thereafter releasing simultaneously said locking means whereby the yieldable means will return the frame to its initial position against the back stop and thereby effect the unwinding of the strips from the spool assemblies.

30. In a typewriting machine, the combination with a carriage including a platen; of a frame mounted on the carriage for reciprocatory movements; an adjustable front stop mounted on the carriage for variably limiting the forward movement of the frame; yieldable means for retaining the frame against movement in one direction; a plurality of bearing shafts fixed to said frame; a carbon strip spool assembly journaled on each shaft; normally ineffective means for each spool assembly for locking the same against unwinding; a strip feeding means mounted on the carriage; means for guiding the strips from the spool assemblies along and in front of the platen to said feeding means; and means for rendering the locking means simultaneously effective, for operating the feeding means to feed the strips to thereby move the frame together with the locked spool assemblies forwardly against the front stop against the tension of said yieldable means, and for thereafter releasing simultaneously said locking means whereby the yieldable means will return the frame to its initial position and thereby effect the unwinding of the strips from the spool assemblies.

31. In a typewriting machine, the combination with a carriage including a platen; of a frame mounted on the carriage for reciprocatory movements; an adjustable back stop mounted on the carriage for variably limiting the backward movement of the frame; an adjustable tensioning means connected to the frame and to the carriage for variably and yieldably retaining the frame against the back stop; a plurality of bearing shafts fixed to said frame; a carbon strip spool assembly journaled on each shaft; normally ineffective means for each spool assembly for locking the same against unwinding; a strip feeding means mounted on the carriage; means for guiding the strips from the spool assemblies along and in front of the platen to said feeding means; and means for rendering the locking means simultaneously effective, for operating the feeding means to feed the strips to thereby move the frame together with the locked spool assemblies against the tension of said tensioning means, and for thereafter releasing simultaneously said locking means whereby the tensioning means will return the frame to its initial position against the back stop and thereby effect the unwinding of the strips from the spool assemblies.

32. In a typewriting machine, the combination with a carriage including a platen; of a frame mounted on the carriage for reciprocatory movements; yieldable means for retaining the frame against movement in one direction; a plurality of bearing shafts fixed to said frame; a carbon strip spool assembly journaled on each shaft; normally ineffective means for each spool assembly for locking the same against unwinding; a brake mounted in each shaft for constant frictional engagement with the associated spool assembly; a strip feeding means mounted on the carriage; means for guiding the strips from the spool assemblies along and in front of the platen to said feeding means; and means for rendering the locking means simultaneously effective, for operating the feeding means to feed the strips to thereby move the frame together with the locked spool assemblies against the tension of said yieldable means, and for thereafter releasing simultaneously said locking means whereby the yieldable means will return the frame to its initial position and thereby effect the unwinding of the strips from the spool assemblies.

33. In a typewriting machine, the combination with a carriage including a platen; of a frame mounted on the carriage for reciprocatory movements; yieldable means for retaining the frame against movement in one direction; a plurality of bearing shafts fixed to said frame; a carbon strip spool assembly journaled on each shaft and including a disc having a toothed periphery; a brake mounted in each shaft for constant frictional engagement with the associated spool assembly; normally ineffective means for each spool assembly for locking the same against unwinding and including a pawl adapted for cooperation with the teeth of each disc; a spring normally urging each pawl toward the teeth of the associated disc; means mounted on the support for normally holding the pawls out of engagement with the teeth of the associated discs; a strip feeding means mounted on the carriage; means for guiding the strips from the spool assemblies along and in front of the platen to said feeding means; and means for releasing simultaneously the pawl holding means to effect a simultaneous locking of the spool assemblies, for operating the feeding means to feed the strips to thereby move the frame together with the locked spool assemblies against the tension of said yieldable means, and to thereafter operate simultaneously said holding means to disengage simultaneously the pawls from the discs whereby the yieldable means will return the frame to its initial position and thereby effect the unwinding of the strips from the spool assemblies.

34. In a typewriting machine, the combination with a carriage including a platen; of a frame mounted on the carriage for reciprocatory movements; yieldable means for retaining the frame against movement in one direction; a plurality of bearing shafts fixed to said frame; a carbon strip spool assembly journaled on each shaft; normally ineffective means for each spool assembly for locking the same against unwinding; a strip feeding means mounted on the carriage; means for guiding the strips from the spool assemblies along and in front of the platen to said feeding means; and means including an operating lever movable in one direction for rendering the locking means effective simultaneously and for operating the feeding means to move the frame together with the locked spool assemblies by the strips against the tension of said yieldable retaining means, said lever being movable in the opposite direction to effect the simultaneous release of said locking means whereby said yieldable retaining means will return the frame to its initial position and thereby effect the unwinding of the strips from the spool assemblies.

35. In a typewriting machine, the combination with a carriage including a platen; of a frame mounted on the carriage for reciprocatory movements; yieldable means for retaining the frame against movement in one direction; a plurality of bearing shafts fixed to said frame; a carbon strip spool assembly journaled on each shaft and including a disc having a toothed periphery; normally ineffective means for each spool assembly for locking the same against unwinding and including a pawl adapted for cooperation with the teeth of each disc; a strip feeding means mounted on the carriage; means for guiding the strips from the spool assemblies along and in front of the platen to said feeding means; and means including an operating lever movable in one direction for rendering the locking means effective simultaneously and for operating the feeding means to move the frame together with the locked spool assemblies by the strips against the tension of said yieldable retaining means, said lever being movable in the opposite direction to effect the simultaneous release of said locking means whereby said yieldable retaining means will return the frame to its initial position and thereby effect the unwinding of the strips from the spool assemblies.

36. In a typewriting machine, the combination with a carriage; of a platen mounted thereon for backward and forward movements; guides respectively positioned above and below the platen for positioning work sheets vertically in front of the platen and normally in tight contact relation therewith; a carbon strip spool journaled on the carriage; a strip feeding means mounted on the carriage; means for guiding the strip from the spool along the platen and between the work sheets to the feeding means; and means mounted on the carriage for first moving the platen rearwardly and for operating the feeding means, and for subsequently effecting an unwinding of the strip from the spool.

37. In a typewriting machine, the combination with a carriage; of a platen mounted thereon for backward and forward movements; guides respectively positioned above and below the platen for positioning work sheets vertically in front of the platen and normally in tight contact relation therewith; a carbon strip spool mounted on the carriage for forward and backward movements; a tensioning means for yieldably resisting the forward movement of the spool; a strip feeding means mounted on the carriage; means for guiding the strip from the spool along the platen and between the work sheets to the feeding means; and means including a manually operable lever mounted on the carriage and movable in one direction for moving the platen rearwardly and for operating the feeding means to effect a forward movement of the spool by the strip and against the tension of said yieldable means, said lever being movable in the opposite direction to effect the unwinding of the strip during the return of the spool to its initial position by said tensioning means.

38. In a typewriting machine, the combination with a carriage; of a platen mounted thereon for backward and forward movements; guides respectively positioned above and below the platen for positioning work sheets vertically in front of the platen and normally in tight contact relation therewith; a carbon strip spool mounted on the carriage for forward and backward movements; a tensioning means for yieldably resisting the forward movement of the spool; normally ineffective means for locking the spool against unwinding during the forward movement of the spool; a strip feeding means mounted on the carriage; means for guiding the strip from the spool along the platen and between the work sheets to the feeding means; and means including a manually operable lever mounted on the carriage and movable in one direction for moving the platen rearwardly, for rendering said spool locking means effective, and for operating the feeding means to effect a forward movement of the locked spool by the strip and against the tension of said yieldable means, said lever being movable in the opposite direction to effect the unlocking of the spool, the return of the platen to its initial position, and the unwinding of the strip during the return of the unlocked spool to its initial position by said tensioning means.

39. In a typewriting machine, the combination with a carriage; of a platen mounted thereon for backward and forward movements; guides respectively positioned above and below the platen for positioning work sheets vertically in front of the platen and normally in tight contact relation therewith; a frame mounted on the carriage for forward and backward movements; yieldable means for retaining the frame against forward movement; a carbon strip spool journaled on the frame; a strip feeding means mounted on the carriage; means for guiding the strip from the spool along and in front of the platen to said feeding means; normally ineffective means mounted on the frame for locking the spool against unwinding; and means including a manually operable lever mounted on the carriage and movable in one direction for rendering said spool locking means effective, for moving the platen rearwardly and for operating the feeding means to effect a forward movement of the frame together with the locked spool against the tension of said yieldable means, said lever being movable in the opposite direction to effect the return of the platen to its initial position, and the release of said spool locking means whereby the yieldable means will then return the frame to its initial position and thereby effect the unwinding of the strip from the spool.

40. In a typewriting machine, the combination with a carriage; of a platen mounted thereon for backward and forward movements; guides respectively positioned above and below the platen for positioning work sheets vertically in front of the platen and normally in tight contact relation therewith; a frame mounted on the carriage for forward and backward movements; a back stop mounted on the carriage for limiting the backward movement of the frame; yieldable means for retaining the frame against forward movement; a carbon strip spool journaled on the frame; a strip feeding means mounted on the carriage; means for guiding the strip from the spool along and in front of the platen to said feeding means; normally ineffective means mounted on the frame for locking the spool against unwinding; and means including a manually operable lever mounted on the carriage and movable in one direction for rendering said spool locking means effective, for moving the platen rearwardly and for operating the feeding means to effect a forward movement of the frame together with the locked spool against the tension of said yieldable means, said lever being movable in the opposite direction to effect the return of the platen to its initial position, and the release of said spool locking means whereby the yieldable means will then return the frame to its initial position against the back stop and thereby effect the unwinding of the strip from the spool.

41. In a typewriting machine, the combination with a carriage including a platen; a manually operable lever fulcrumed on the carriage; a vertical supporting plate mounted on the rear of the carriage for forward and backward movements; a back stop for limiting the backward movement of the plate; a front stop for limiting the forward movement of the plate; a spring connecting the plate and the carriage for yieldably retaining the plate against the back stop; a plurality of horizontal bearing shafts fixed to the plate and extending rearwardly therefrom; a plurality of carbon strip spool assemblies independently journaled on each bearing shaft, each assembly including a disc having a toothed periphery; brakes mounted in each shaft for cooperation with the associated spool assemblies; a plurality of pawl bearing shafts fixed to the plate and extending rearwardly therefrom and respectively disposed at one side of the spool supporting shafts; a plurality of locking pawls journaled on each pawl bearing shaft for cooperation with the teeth of the associated spool discs; springs for normally urging the pawls into engagements with the teeth of the discs; each pawl comprising a nose and a finger extending upwardly above the nose; a bail journaled on each pawl bearing shaft and including a holding rod disposed in advance of the pawl fingers; a carbon strip feeding means mounted on the carriage; means for directing the strips from the spools along and in front of the platen to said feeding means; driving connections between the manually operable lever and the feeding means; and connections between said pawl holding means and the manually operable lever for normally retaining the pawls disengaged from the discs; the manually operable lever being movable in one direction to release the pawl holding means to effect a locking of the spools by the pawls and to operate the feeding means to move the plate forwardly by the strips against the tension of the retaining spring to the front stop, said lever being movable in the opposite direction to release said pawls from the discs and to effect an unwinding of the strips from the spools upon return of the plate by the tension spring against the back stop.

42. In a typewriting machine, the combination with a carriage including a platen; of a frame mounted on the carriage for reciprocatory movements; yieldable means for retaining the frame against movement in one direction; a bearing shaft fixed to said frame; a carbon strip spool assembly journaled on the shaft and comprising a metal hub, a carbon strip spool mounted on the hub to rotate therewith, a spring pressed brake shoe mounted in the bearing shaft for frictional engagement with the metal hub, a strip feeding means mounted on the carriage, means for guiding the strip from the spool along and in front of the platen to said feeding means; normally ineffective means mounted on the frame for locking the spool assembly against unwinding; and means for rendering said locking means effective, for operating the feeding means to feed the strip and thereby move the frame together with the locked spool assembly against the tension of said yieldable means, and for thereafter releasing said locking means whereby the yieldable means will return the frame to its initial position and thereby effect an unwinding of the strip from the spool assembly.

43. In a typewriting machine, the combination with a main frame element having a carriage element mounted thereon, of a support mounted on one of said elements, a horizontal bearing shaft having one end fixed to said support, a carbon strip spool assembly journaled on said shaft, a second horizontal bearing shaft having one end fixed to said support, a pawl journaled on said second shaft for locking the spool assembly against unwinding, and a two-armed latch fulcrumed at its angle on the support and having the outer ends of said arms detachably connected to the outer ends of said shafts.

44. In a typewriting machine, the combination with a main frame, of a carriage including a platen, means for supporting the front part of the carriage on the front part of the main frame for letter space movements, the rear portion of the carriage having legs depending in rear of the main frame, a horizontal track mounted on the rear portion of the main frame for supporting the rear portion of the carriage, a horizontal support fixed to said depending legs, a spool carrying frame comprising a vertically disposed plate slidably mounted on the support for forward and backward movements transverse of the main frame, a carbon strip spool journaled on said plate, yieldable means connecting the carriage and the plate for normally retaining the plate against forward movement, normally ineffective means for locking the spool against unwinding, a strip feeding means mounted on the carriage, means for directing the strip from the spool along and in front of the platen to the feeding means, normally ineffective means for locking the spool against unwinding; and means for rendering said spool locking means effective, for operating the feeding means and for bodily moving the locked spool by the strip, for subsequently effecting an unlocking of the spool, and for effecting a return of the unlocked spool to its initial position and simultaneously effecting the unwinding of the strip from the spool.

45. In a typewriting machine, the combination with a main frame element and a carriage element; of a platen mounted on the carriage element for backward and forward movements; guides respectively positioned above and below the platen for positioning work sheets vertically in front of the platen and normally in tight contact relation therewith; a carbon strip spool journaled on one of said elements, a strip feeding means mounted on the carriage element, means for guiding the strip from the spool along and in front of the platen to said feeding means, a work sheet positioning arm mounted on the carriage element between the upper and lower guides for forward and backward movements relative to the work sheets, and means including an operating lever mounted on the carriage element for effecting a rearward movement of the platen, a forward movement of the arm, and the operation of the strip feeding means.

46. In a typewriting machine, the combination with a carriage including a platen, of means for guiding paper webs under the platen and upwardly in front of the same; a carbon strip spool journaled on the carriage; a strip feeding means mounted on the carriage; means for guiding the strip from the spool along and in front of the platen and between the paper webs to the feeding means; and means for first operating the feeding means and for subsequently effecting an unwinding of the strip from the spool.

47. In a typewriting machine, the combination with a carriage including a platen; of a frame mounted on the carriage for reciprocatory movement; yieldable means for retaining the frame against movement in one direction; a bearing shaft fixed to said frame; a carbon strip spool assembly journaled on the shaft; normally ineffective means associated with the spool assembly for holding the carbon strip against unwinding; a strip feeding means mounted on the carriage; means for guiding the strip from the spool assembly along and in front of the platen to said feeding means; and means for rendering the holding means effective, for operating the feeding means to feed the strip and move the frame together with the spool assembly against the tension of said yieldable means, and for thereafter releasing said holding means whereby the yieldable means will return the frame to its initial position and thereby effect the unwinding of the strip from the spool assembly.

GEORGE F. HANDLEY.